Figure 1:
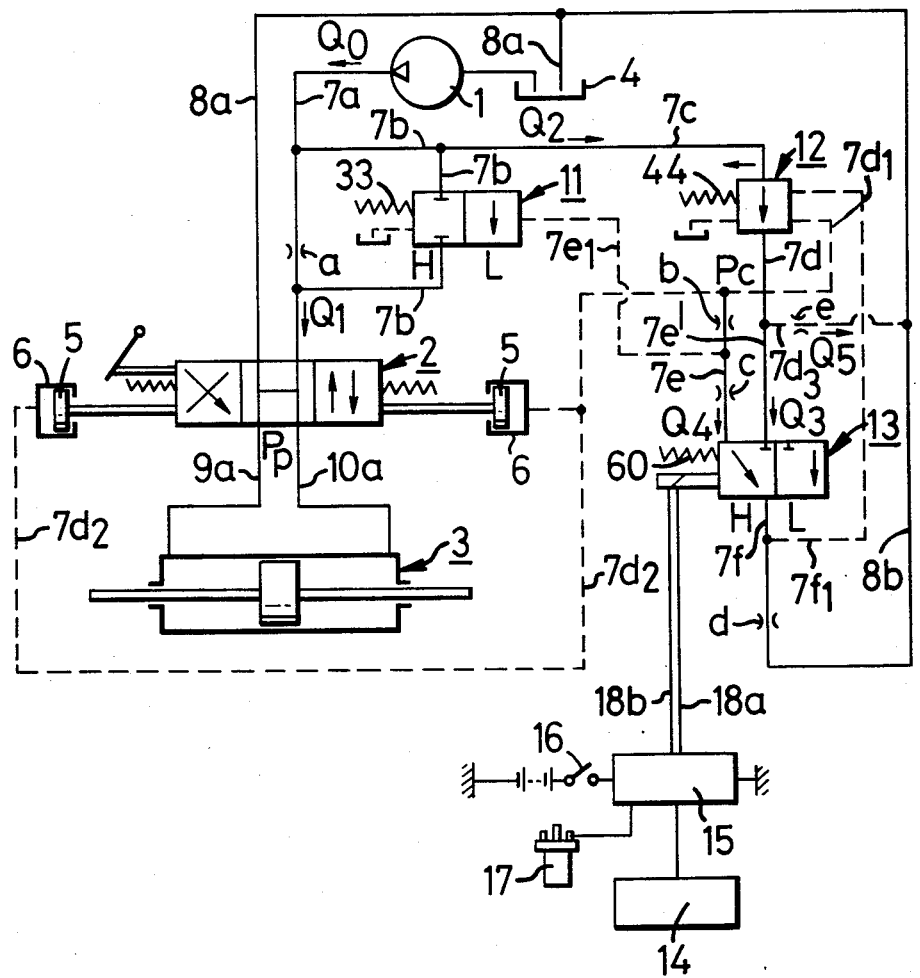

United States Patent [19]

Kozuka

[11] Patent Number: 4,621,704
[45] Date of Patent: Nov. 11, 1986

[54] POWER STEERING SYSTEM

[75] Inventor: Hajime Kozuka, Okazaki, Japan

[73] Assignee: Mitsubishi Jidosha Kogyo Kabushiki Kaisha, Tokyo, Japan

[21] Appl. No.: 599,673

[22] Filed: Apr. 12, 1984

[30] Foreign Application Priority Data

| | | |
|---|---|---|
| May 19, 1983 [JP] | Japan | 58-86598 |
| May 19, 1983 [JP] | Japan | 58-86600 |
| May 19, 1983 [JP] | Japan | 58-73787[U] |
| May 19, 1983 [JP] | Japan | 58-73789[U] |
| May 19, 1983 [JP] | Japan | 58-73790[U] |
| May 19, 1983 [JP] | Japan | 58-73791[U] |
| May 19, 1983 [JP] | Japan | 58-73792[U] |
| Jun. 10, 1983 [JP] | Japan | 58-87967[U] |

[51] Int. Cl.⁴ .............................................. B62D 5/06
[52] U.S. Cl. ................................ 180/143; 91/375 A; 91/363 R
[58] Field of Search ............ 180/142, 143; 60/384, 60/385, 363 R; 91/375 A, 459, 467; 137/596.13

[56] References Cited

U.S. PATENT DOCUMENTS

| | | | |
|---|---|---|---|
| 1,947,973 | 2/1934 | Davis | 91/375 R |
| 3,407,707 | 10/1968 | Belliere | 91/29 |
| 3,458,998 | 8/1969 | Bishop | 91/6 |
| 3,645,296 | 2/1972 | Adams | 91/375 A |
| 3,800,407 | 4/1974 | Dumeah | 91/54 |
| 3,867,870 | 2/1975 | Shimoura | 91/375 A |
| 3,930,554 | 1/1976 | Ward | 91/375 A |
| 3,998,131 | 12/1976 | Adams | 91/375 A |
| 4,009,641 | 3/1977 | Rohde et al. | 91/375 A |
| 4,034,825 | 7/1977 | Adams | 91/375 A |
| 4,043,419 | 8/1977 | Larson et al. | 60/484 |
| 4,063,490 | 12/1977 | Duffy | 91/375 A |
| 4,065,921 | 1/1978 | Baatrup et al. | 60/385 |
| 4,096,883 | 6/1978 | Yip | 91/467 |
| 4,331,211 | 5/1982 | Lang | 180/141 |
| 4,335,867 | 6/1982 | Bihlmaier | 91/6 |
| 4,343,330 | 8/1982 | Numasawa et al. | 91/375 A |
| 4,356,759 | 11/1982 | Ljubimov et al. | 91/6 |
| 4,377,217 | 3/1983 | Nishikawa et al. | 180/143 |
| 4,378,030 | 3/1983 | Duffy | 91/375 A |
| 4,460,016 | 7/1984 | Haga et al. | 91/375 A |
| 4,487,225 | 12/1984 | Adams | 91/375 R |

FOREIGN PATENT DOCUMENTS

| | | |
|---|---|---|
| 2234718 | 7/1972 | Fed. Rep. of Germany . |
| 2851773 | 11/1978 | Fed. Rep. of Germany . |
| 2906047 | 2/1979 | Fed. Rep. of Germany . |
| 2146032 | 2/1973 | France . |
| 2365472 | 5/1978 | France ............... 91/375 A |
| 2394437 | 2/1979 | France ............... 91/375 R |
| 2448677 | 2/1979 | France . |
| 0039565 | 3/1983 | Japan ..................... 180/143 |
| 807278 | 1/1959 | United Kingdom ........ 91/375 |
| 2035931 | 6/1980 | United Kingdom . |

Primary Examiner—Martin P. Schwadron
Assistant Examiner—Sheri M. Novack
Attorney, Agent, or Firm—Wenderoth, Lind & Ponack

[57] ABSTRACT

The known power steering system of the type that movement of a steering wheel is transmitted via a torsion bar to an oil path switching valve to actuate a power cylinder in a desired steering direction by switching a high pressure oil path extending from an oil pump to the oil path switching valve and a low pressure oil path extending from the oil path switching valve to an oil tank and a part of working oil flowing through the high pressure oil path is led to a reaction piston to restrain torsion of the torsion bar, is improved in that the power steering system comprises a control oil path branched from the high pressure oil path and communicating with the reaction piston, a pressure control valve interposed in the control oil path for controlling an oil pressure to be equal to or lower than a predetermined highest pressure, a flow rate control valve provided on the downstream side of the pressure control valve for controlling a flow rate depending upon a car speed, a first orifice for communicating the downstream side of the flow rate control valve to the low pressure oil path, and a pilot oil path for transmitting a pilot pressure generated on the upstream of the first orifice to the pressure control valve.

19 Claims, 47 Drawing Figures

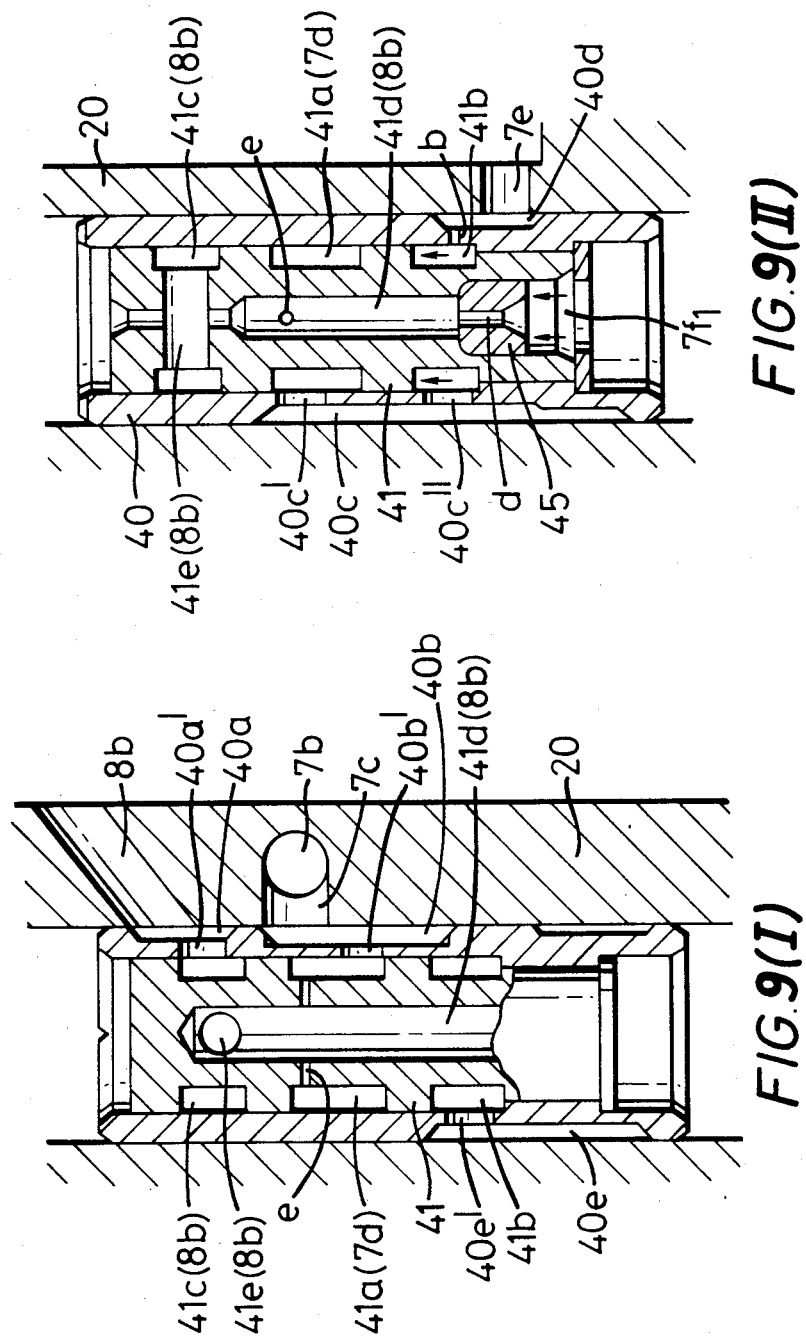

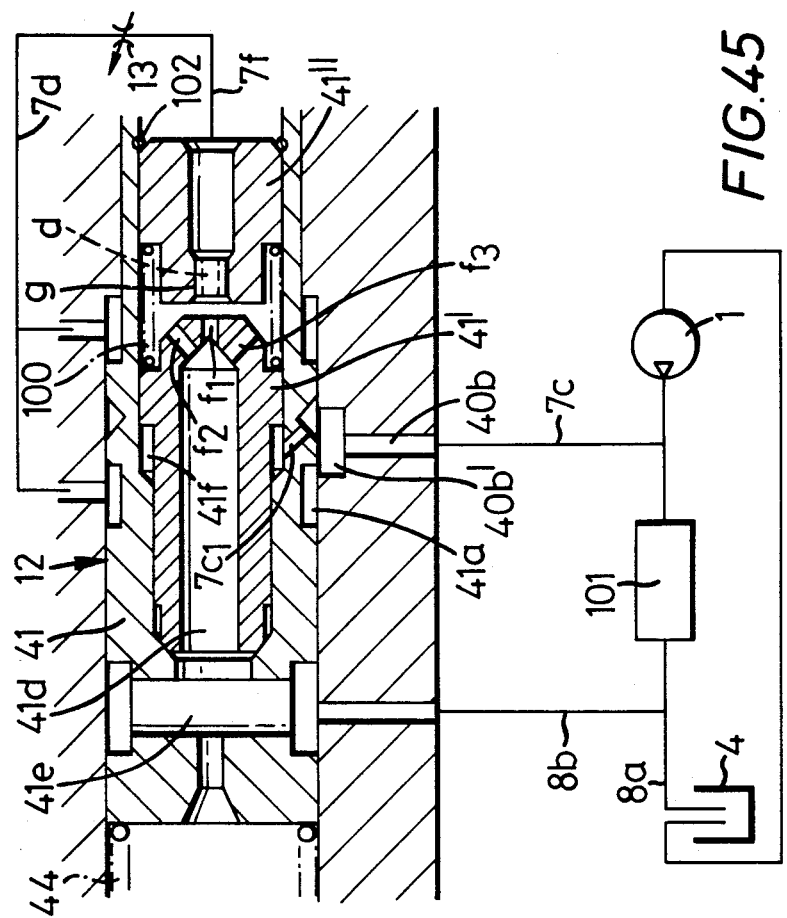
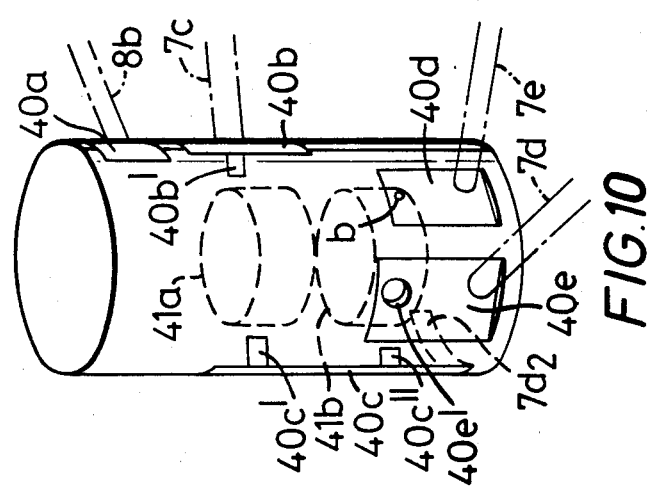

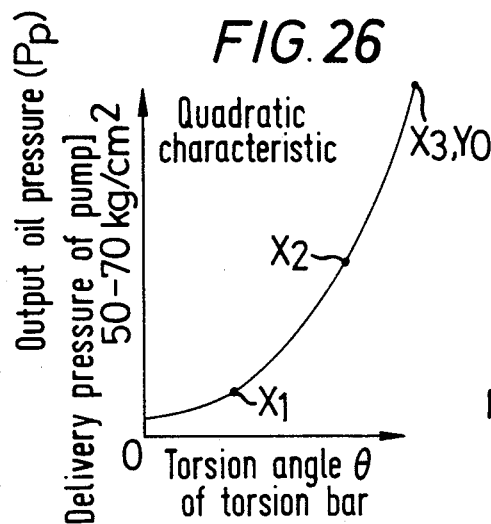
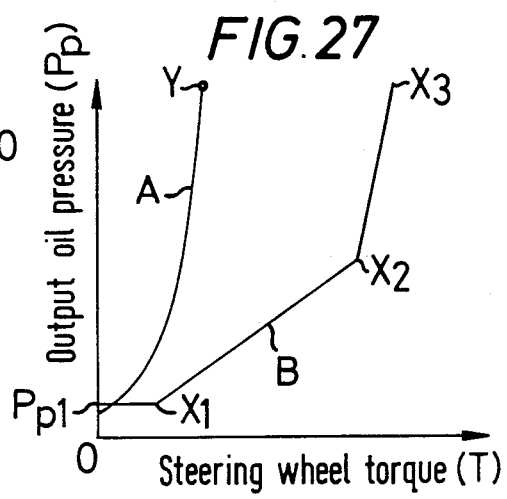
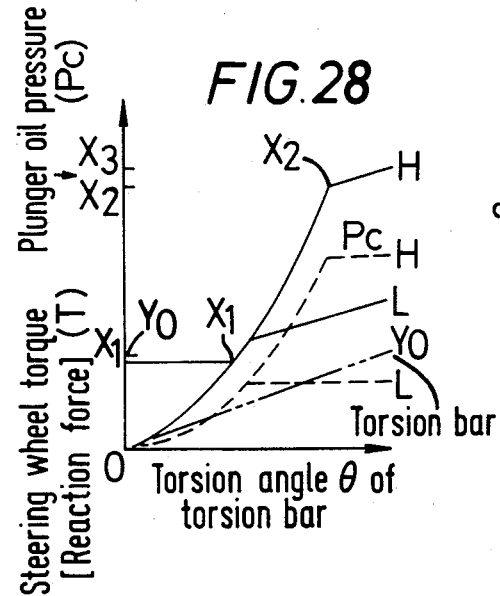
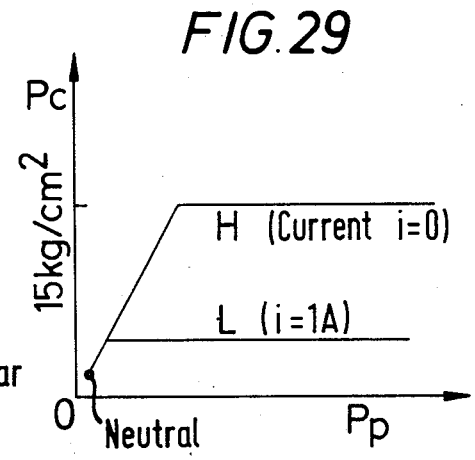
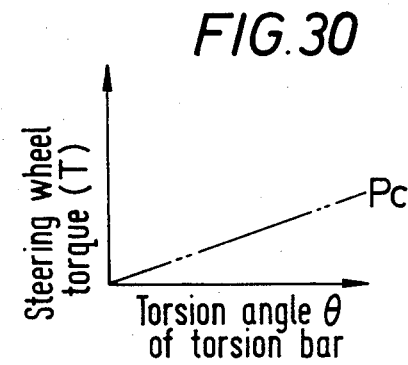
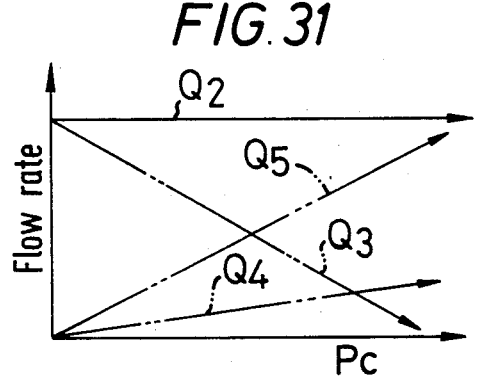

POWER STEERING SYSTEM

The present invention relates to improvements in a power steering system of the type that movement of a steering wheel is transmitted via a torsion bar to an oil path switching valve to actuate a power cylinder in a desired steering direction by switching a high pressure oil path extending from an oil pump to the oil path switching valve and a low pressure oil path extending from the oil path switching valve to an oil tank and a part of working oil flowing through the high pressure oil path is led to a reaction piston to restrain torsion of the torsion bar.

Various designs of a power steering system of the above-mentioned type have been hefetofore known. However, some known power steering systems of the above-mentioned type had a shortcoming that although the power steering system enables a driver to handle a steering wheel with a small force upon steering under a stop condition, appropriate reaction feeling cannot be obtained by a driver upon steering under a high speed condition, resulting in dangerous over-steering.

It is therefore one object of the present invention to provide an improved power steering system which enables a driver to handle a steering wheel with a small force upon steering under a stop condition but nevertheless enables a driver to get appropriate reaction feeling from a steering wheel upon steering under a high speed condition.

According to one feature of the present invention, there is provided a power steering system comprising an input shaft coupled to a steering wheel, a torsion bar for transmitting rotation of the input shaft to an output shaft, an oil path switching valve in which oil paths are switched according to a rotational angle difference between the input shaft and the output shaft, a power cylinder coupled to the output shaft, a high pressure oil path for supplying working oil delivered from an oil pump to the power cylinder via the oil path switching valve, a low pressure oil path for returning the working oil from the power cylinder to an oil tank via the oil path switching valve, a reaction piston interposed between the input shaft and the output shaft for restraining the rotational angle difference therebetween by a restraint force, a control oil path branched from the high pressure oil path and communicating with the reaction piston, a pressure control valve interposed in the control oil path for controlling an oil pressure to be equal to or lower than a predetermined highest pressure, a flow rate control valve provided on the downstream side of the pressure control valve for controlling a flow rate depending upon a car speed, a first orifice for communicating the downstream side of the flow rate control valve to the low pressure oil path, and a pilot oil path for transmitting a pilot pressure generated on the upstream side of the first orifice to the pressure control valve.

Figure 2:
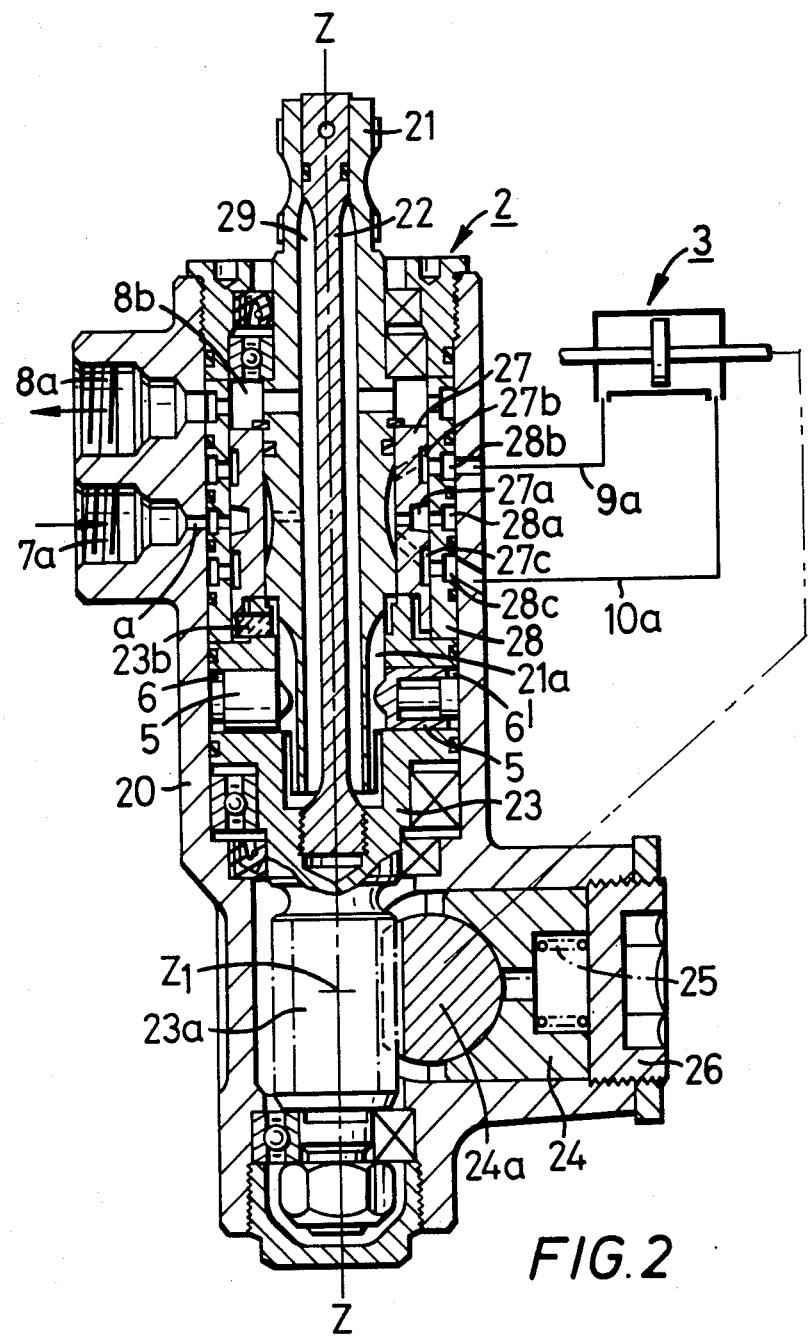
Figure 3:
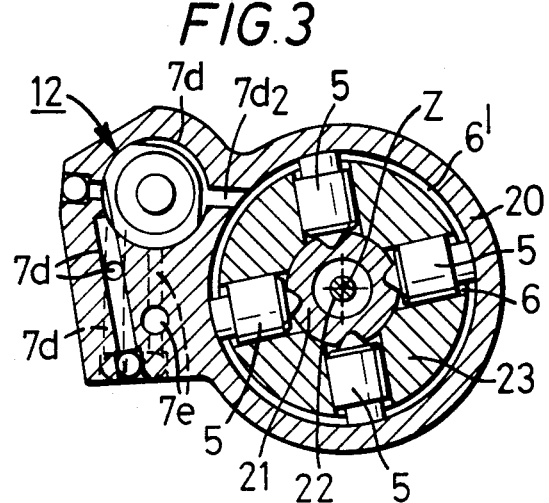
Figure 4:
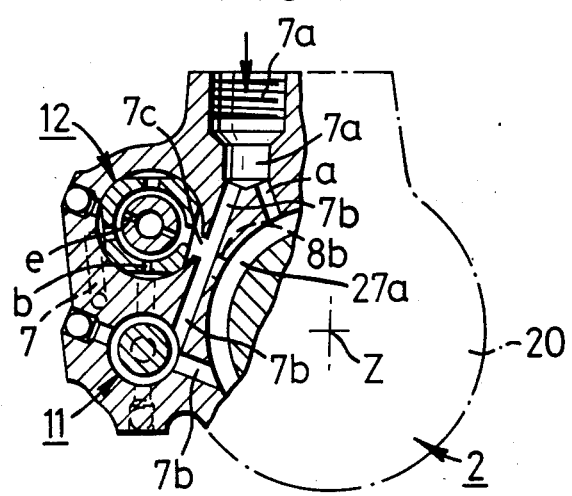
Figure 5:
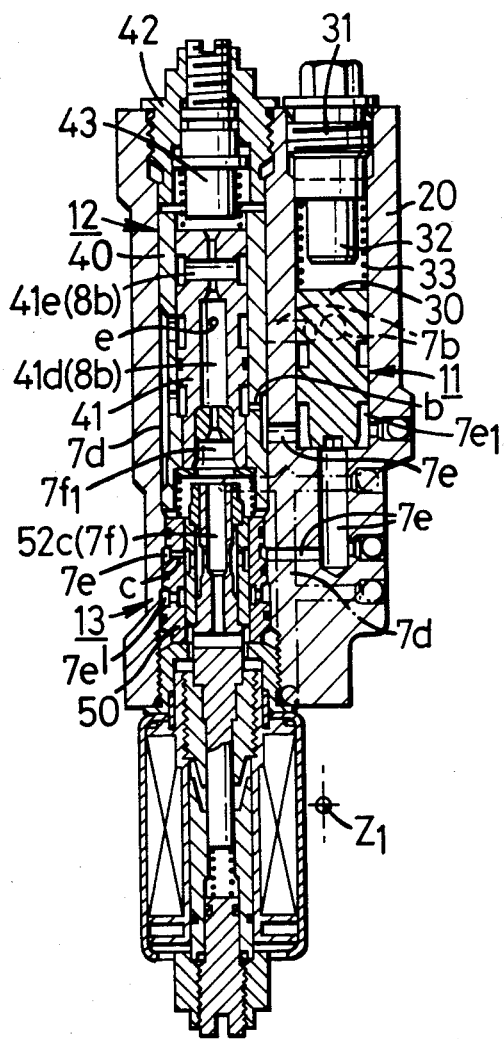
Figure 6:
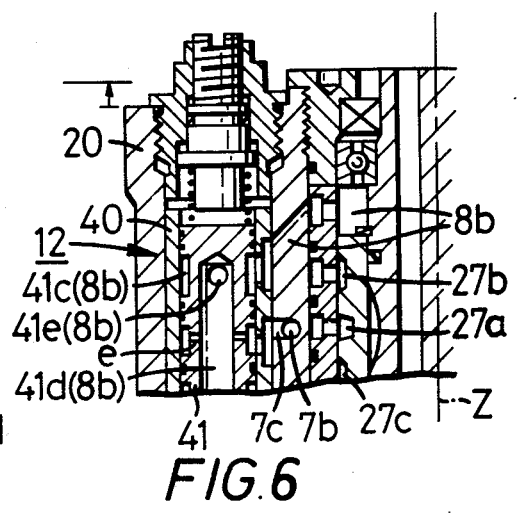
Figure 7:
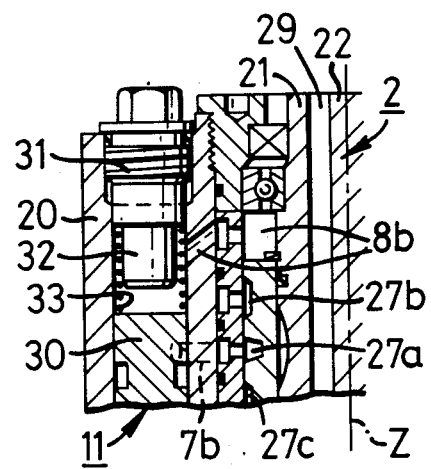
Figure 8I:
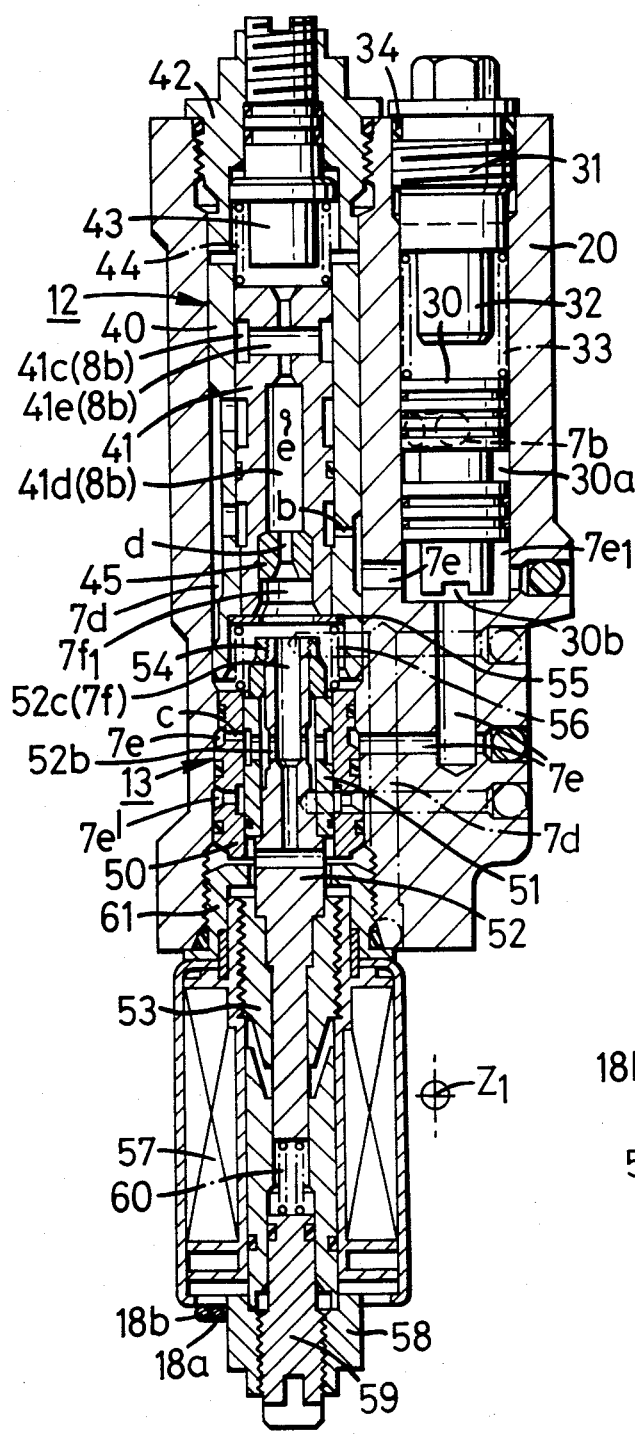
Figure 8:
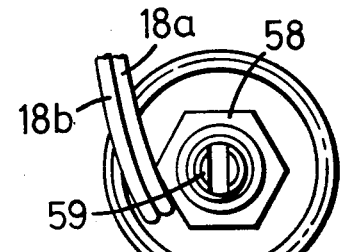
Figure 11:
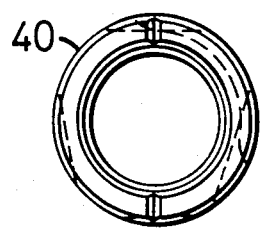
Figure 12:
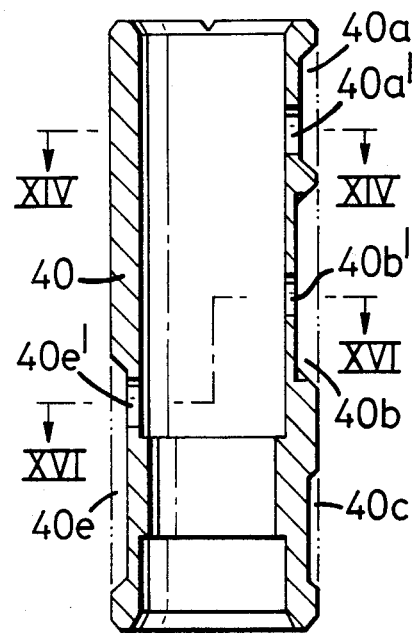
Figure 13:
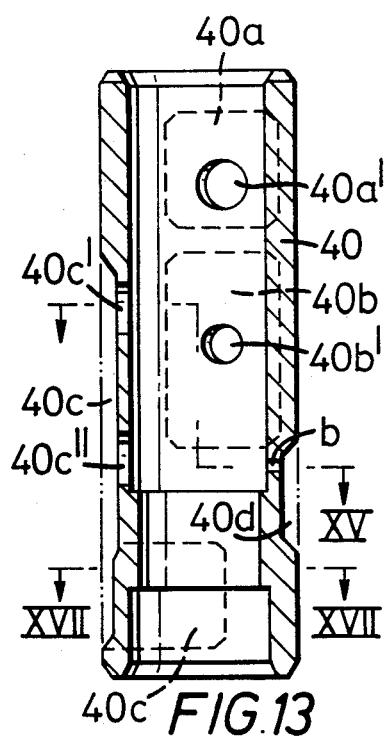
Figure 14:
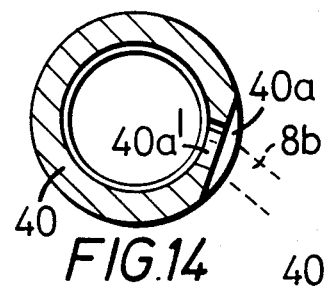
Figure 17:
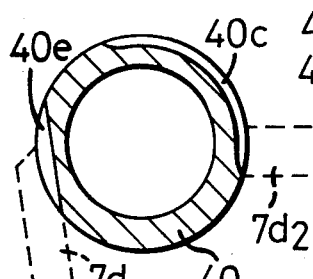
Figure 16:
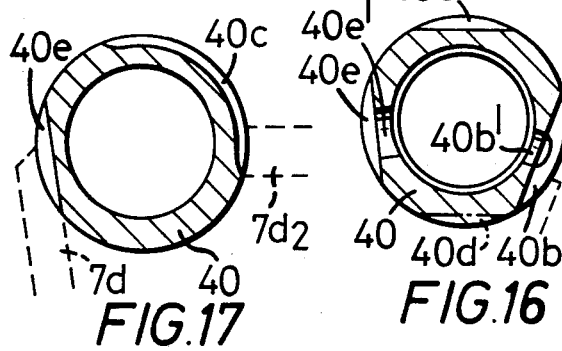
Figure 15:
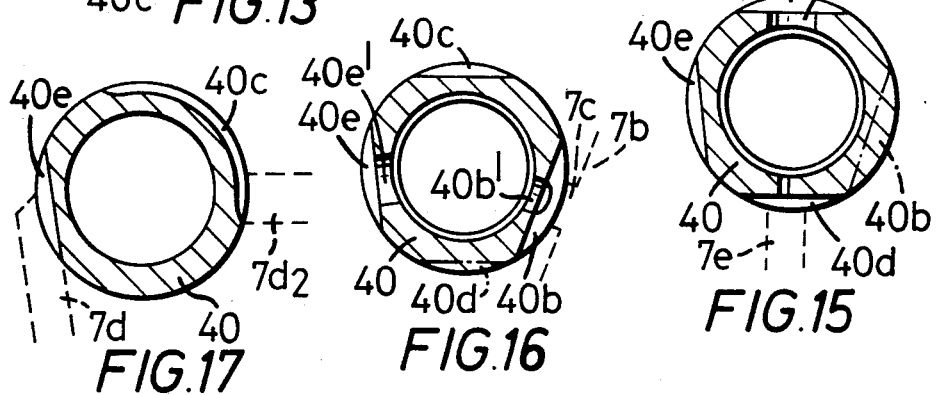
Figure 18:
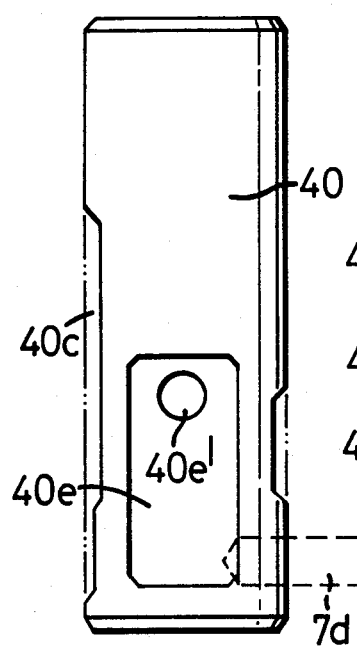
Figure 19:
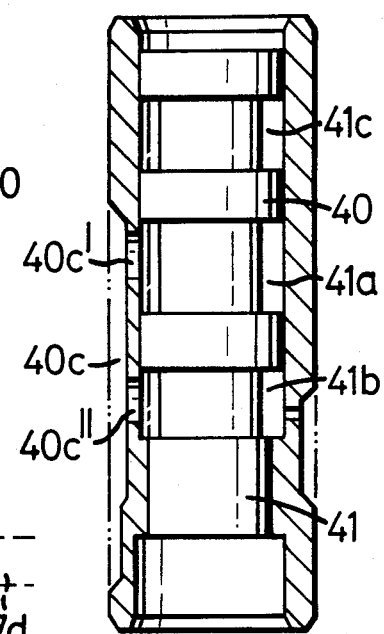
Figure 20:
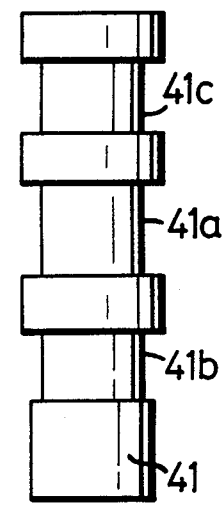
Figure 22:
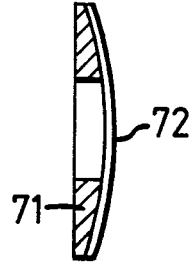
Figure 23:
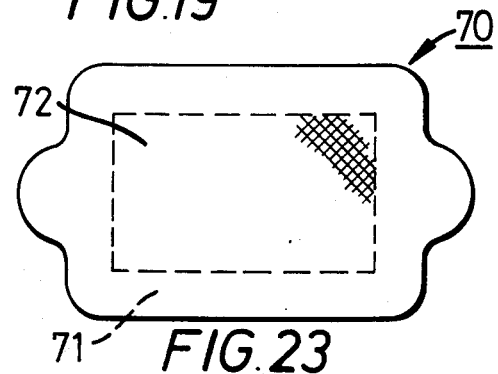
Figure 24:
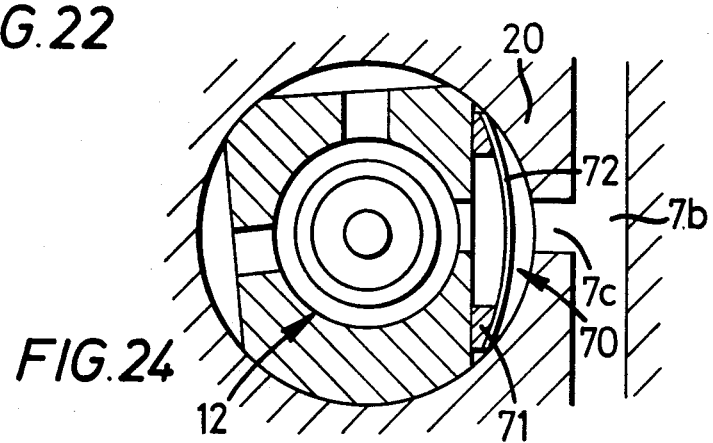
Figure 21:
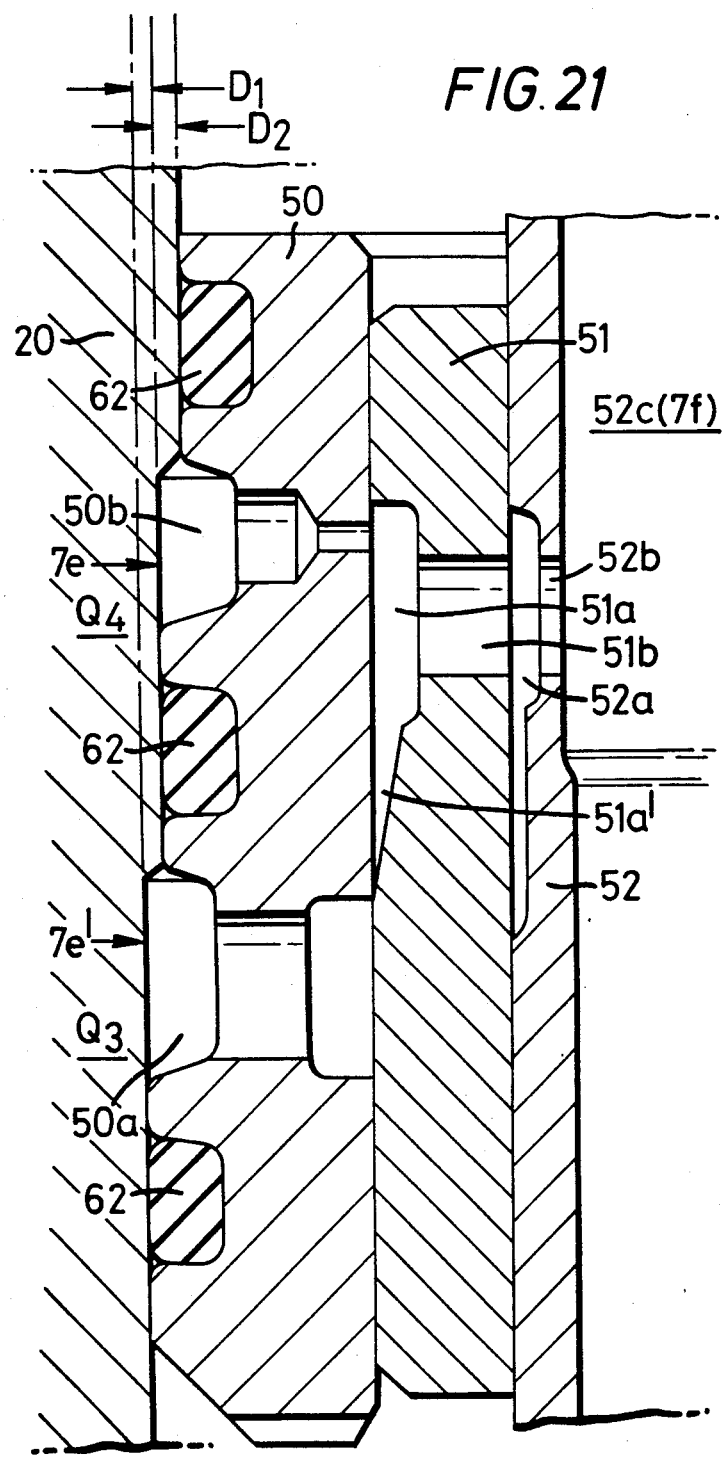
Figure 25:
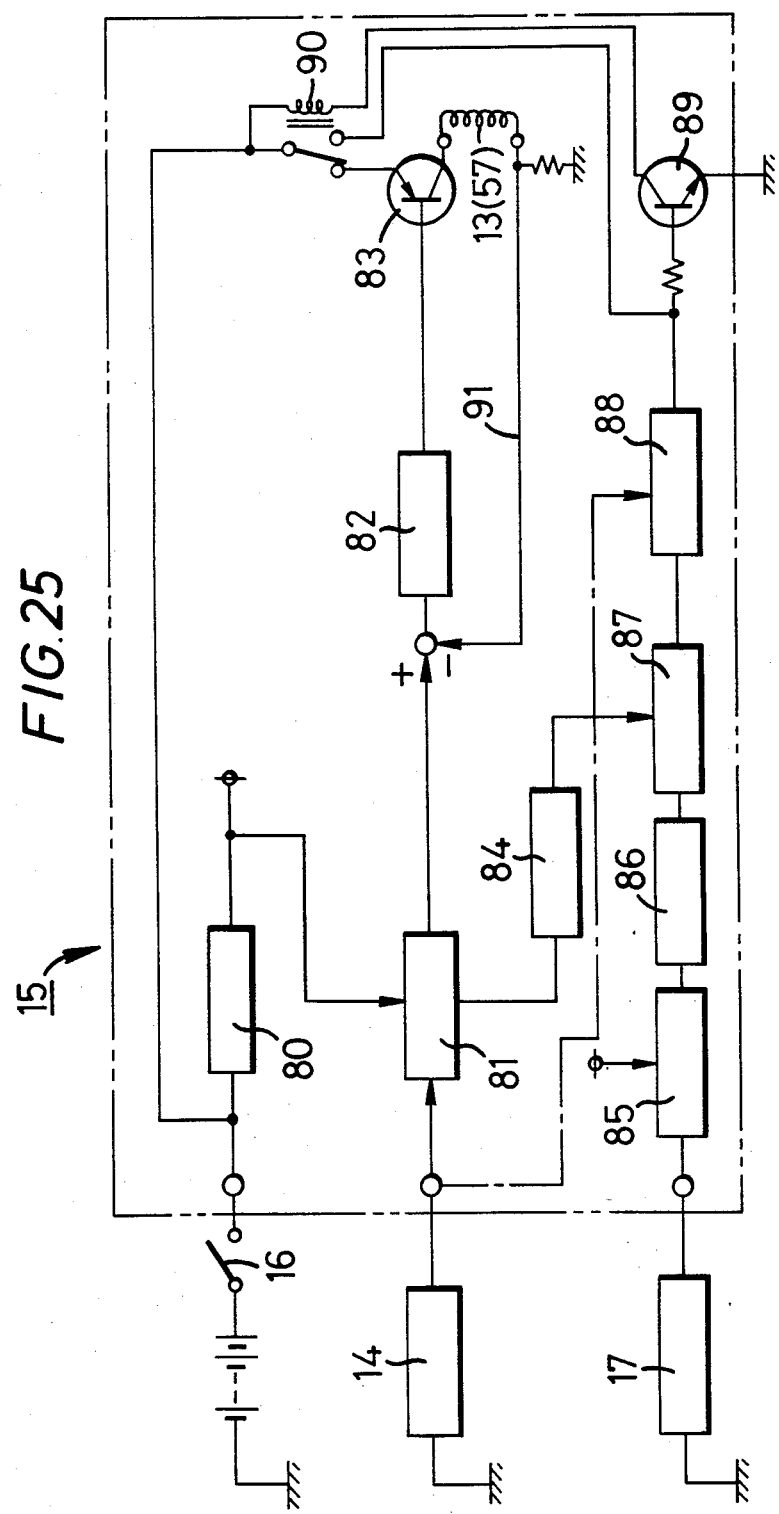
Figure 32:
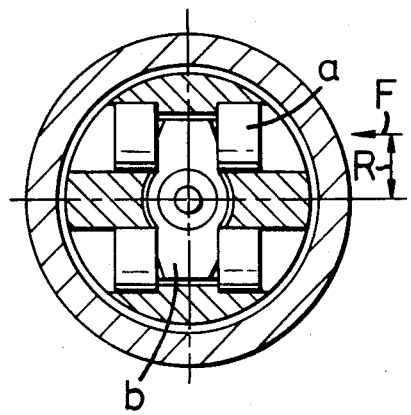
Figure 33:
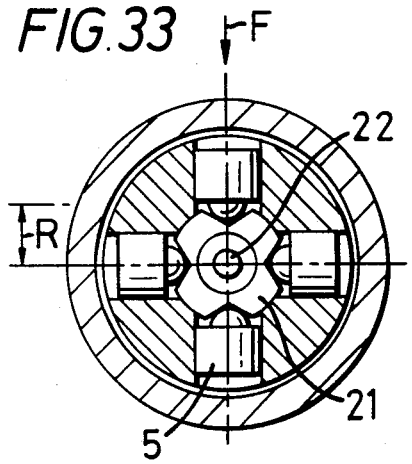
Figure 34:
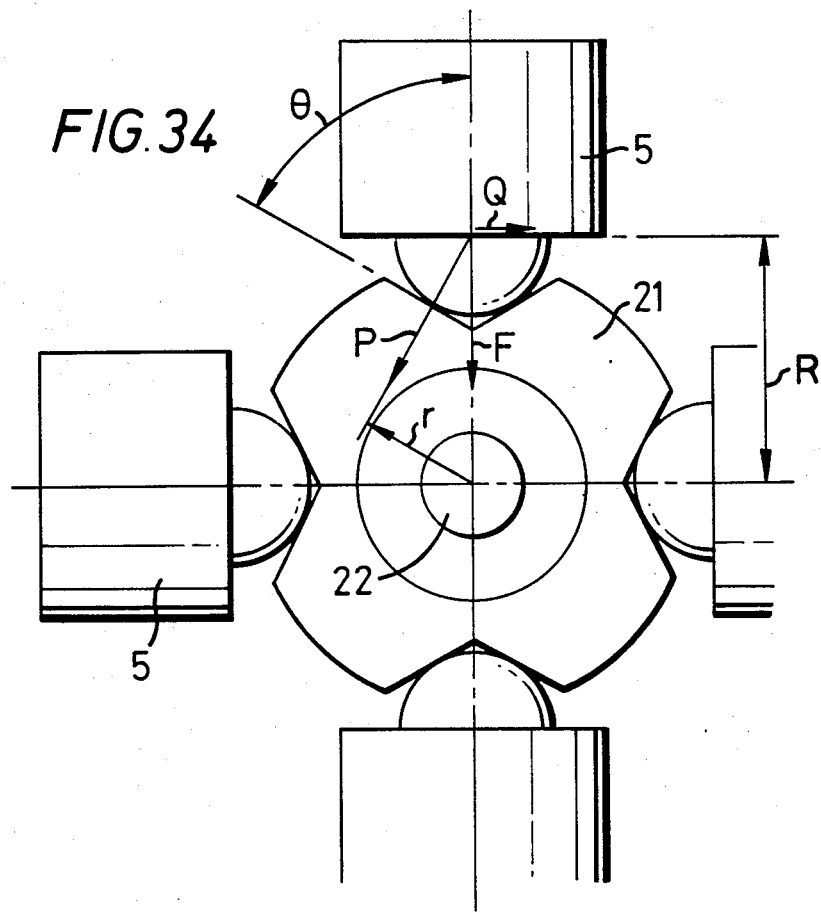
Figure 35:
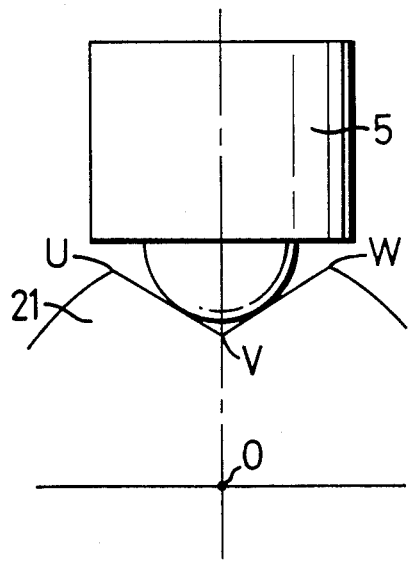
Figure 36:
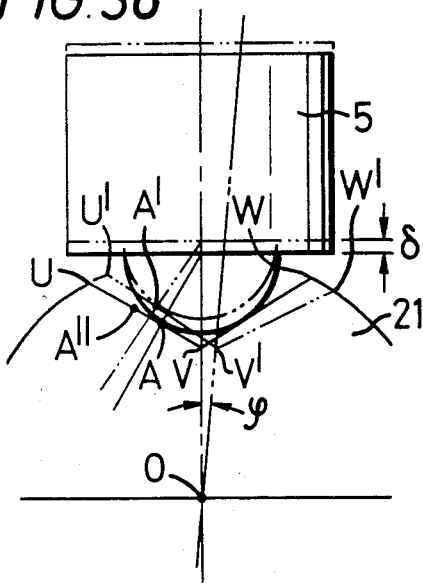
Figure 37:
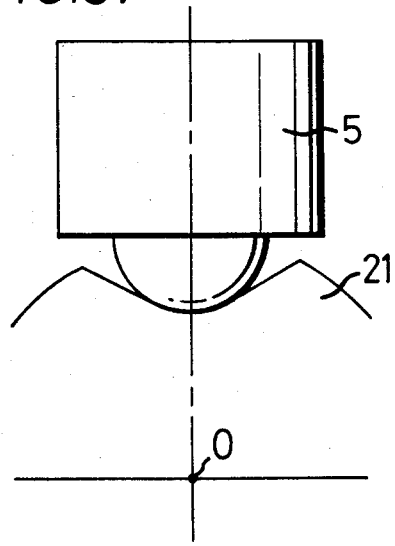
Figure 38:
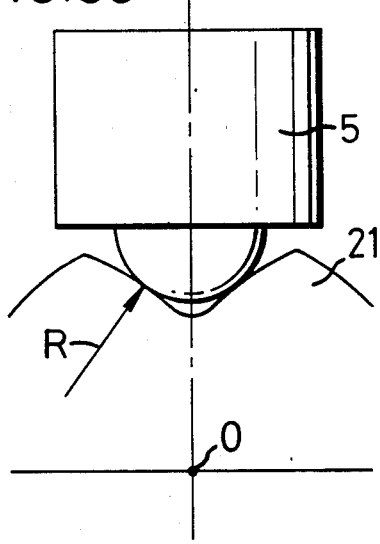
Figure 39:
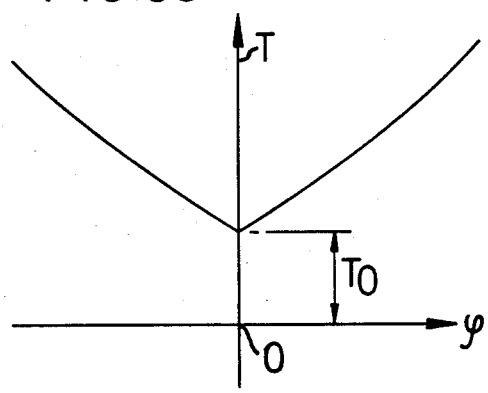
Figure 40:
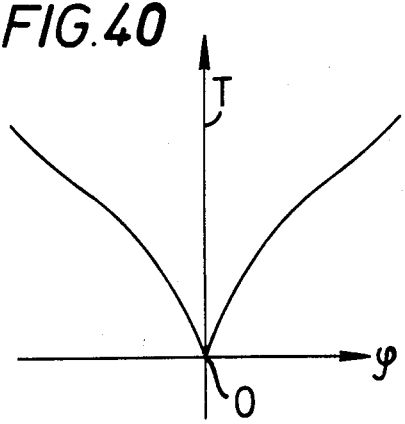
Figure 41:
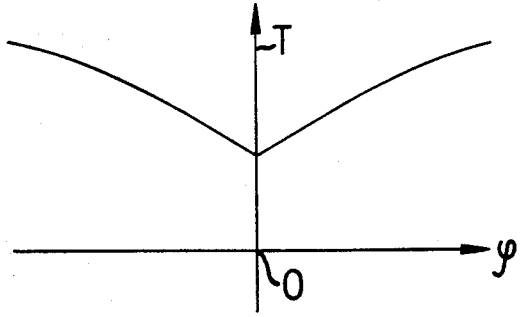

The above-mentioned and other features and objects of the present invention will become more apparent by reference to the following description of preferred embodiments of the invention taken in conjunction with the accompanying drawings, wherein:

FIG. 1 is an oil hydraulic circuit diagram showing one preferred embodiment of a power steering system according to the present invention, FIG. 2 is a longitudinal cross-section side view of an oil path switching valve, FIG. 3 is a transverse cross-section plan view of a lower portion of the same valve, FIG. 4 is a transverse cross-section plan view of an upper portion of the same valve, FIG. 5 is a longitudinal cross-section side view of a change-over valve, a pressure control valve and a flow rate control valve, FIG. 6 is another longitudinal cross-section side view of the oil path switching valve and the pressure control valve, FIG. 7 is another longitudinal cross-section side view of the oil path switching valve and the change-over valve, FIG. 8(I) is an enlarged longitudinal cross-section side view of the change-over valve, the pressure control valve and the flow rate control valve, FIG. 8(II) is an end view of the flow rate control valve, FIG. 9(I) is an enlarged longitudinal cross-section side view of the pressure control valve, FIG. 9(II) is another enlarged longitudinal cross-section side view of the same valve, FIG. 10 is an enlarged perspective view of a sleeve in the pressure control valve, FIG. 11 is an enlarged plan view of the sleeve in the pressure control valve, FIG. 12 is an enlarged longitudinal cross-section side view of the same sleeve, FIG. 13 is another enlarged longitudinal cross-section side view of the same sleeve, FIG. 14 is a transverse cross-section plan view taken along line XIV—XIV in FIG. 12 as viewed in the direction of arrows, FIG. 15 is a transverse cross-section plan view taken along line XV—XV in FIG. 13 as viewed in the direction of arrows, FIG. 16 is a transverse cross-section plan view taken along line XVI—XVI in FIG. 12 as viewed in the direction of arrows, FIG. 17 is a transverse cross-section plan view taken along line XVII—XVII in FIG. 13 as viewed in the direction of arrows, FIG. 18 is a side view of the sleeve in the same pressure control valve, FIG. 19 is a longitudinal cross-section side view showing the sleeve and a spool in the same valve, FIG. 20 is a side view showing the same spool, FIG. 21 is an enlarged longitudinal cross-section side view of a sleeve and a spool in the flow rate control valve, FIG. 22 is a transverse cross-section plan view of a filter, FIG. 23 is a front view of the same filter, FIG. 24 is a transverse cross-section plan view showing a mounted state of the same filter, FIG. 25 is a circuit diagram of a control apparatus, FIG. 26 is a schematic diagram showing a relation between an output oil pressure of an oil path switching valve (a delivery pressure of a pump) and a torsion angle of a torsion bar (a relative angular displacement between a spool and an input shaft in an oil path switching valve), FIG. 27 is a schematic diagram showing a relation between the output oil pressure and a steering wheel torque, FIG. 28 is a schematic diagram showing a relation between an oil pressure in a reaction plunger side chamber (a steering wheel torque) and a torsion angle of a torsion bar, FIG. 29 is a schematic diagram showing a relation between the oil pressure in the reaction plunger side chamber and the output oil pressure, FIG. 30 is a schematic diagram showing a relation between the steering wheel torque and the torsion angle of the torsion bar, FIG. 31 is a schematic diagram showing a flow rate on an inlet side of a control system and flow rates at various portions within the control system, FIG. 32 is a plan view showing reaction pistons in the prior art, FIG. 33 is a plan view showing reaction pistons according to the present invention, FIG. 34 is a schematic view for explaining the operation of the reaction pistons in FIG. 33, FIGS. 35 and 36 are schematic views for explaining the reason why a torsion torque can be arbitrarily preset according to the present invention, FIGS. 37 and 38 are schematic views showing other preferred embodiments of the grooves formed on the input shaft, FIG. 39 is a schematic diagram showing characteristics of the embodiment shown in FIGS. 35 and 36, FIG. 40 is a schematic diagram showing a characteristic of the embodiment shown in FIG. 37, FIG. 41 is a schematic diagram showing a characteristic of the embodiment shown in FIG. 38, FIGS. 42, 43 and 44 are schematic views showing still other preferred embodiments of the reaction pistons, and FIG. 45 is a longitudinal cross-section side view showing another preferred embodiment of the pressure control valve.

Now the present invention will be described in greater detail with reference to FIGS. 1 to 45 of the accompanying drawings. Explaining, at first, the outline of the power steering system according to the present invention with reference to FIG. 1, reference numeral (1) designates an oil pump driven by an engine (not shown), and this oil pump (1) is an oil pump whose flow rate is constant (about 7 l/min.) and whose delivery pressure is variable (5 kg/cm$^2$–70 kg/cm$^2$). In addition, reference numeral (2) designates a four way type oil path switching valve (rotary valve), numeral (3) designates a steering power cylinder, numeral (4) designates an oil tank, numeral (5) designates a plurality of reaction pistons, numeral (6) designates chambers formed on the rear side of the respective reaction pistons, numeral (7a) designates a high pressure oil path extending from the oil pump (1) to the oil path switching valve, numeral (8a) designates a low pressure oil path extending from the oil path switching valve (2) to the oil tank (4), numerals (9a) and (10a) designates oil paths extending from the oil path switching valve (2) to the steering power cylinder (3), reference character (a) designates a main orifice provided in the midway of the high pressure oil path, numeral (7b) designates a bypassing oil path connected to the high pressure oil paths (7a) on the upstream side and on the downstream side, respectively, of the main orifice (a), numeral (11) designates a change-over valve (COV) forming oil pressure increase means which is interposed in the midway of the same bypassing oil path (7b), numeral (12) designates a pressure control valve connected to the oil path (7b) on the upstream side of the change-over valve (11) via an oil path (7c), numeral (13) designates a flow rate control valve, numeral (7d) designates an oil path extending from the pressure control valve (12), and a pair of parallel oil paths (7e) and (7e') branched from the oil path (7d) extend to the above-mentioned flow rate control valve (13). In addition, reference numeral (7d$_1$) designates an auxiliary pilot oil path extending from the midway of the oil path (7d) to the above-mentioned pressure control valve (12), numeral (7d$_2$) designates an oil path extending from the midway of the oil path (7d) to the chambers (6) on the rear side of the aforementioned reaction pistons (5), numeral (7d$_3$) designates an oil path extending from the midway of the above-mentioned oil path (7d) to the low pressure oil path (8b), reference characters (b) and (c) designate second and fourth orifices, respectively, provided in the midway of the above-mentioned oil path (7e), numeral (7e$_1$) designates a COV pilot oil path extending from the oil path (7e) between the orifices (b) and (c) to the above-mentioned change-over valve (11), reference character (e) designates a third orifice provided in the midway of the oil path (7d$_3$), numeral (7f) designates an oil path extending from the above-mentioned flow rate control valve (13) to the low pressure oil path (8b), reference character (d) designates a first orifice provided in the midway of the oil path (7f), numeral (7f$_1$) designates a main pilot oil path extending from the oil path (7f) on the upstream side of the first orifice (d) to the above-mentioned pressure control valve (12), numeral (14) designates a car speed sensor, numeral (15) designates a control apparatus, numeral (16) designates an ignition switch, numeral (17) designates an ignition coil, numerals (18a) and (18b) designate wirings extending from the ignition coil (17) to an electromagnetic coil (solenoid) of the above-mentioned flow rate control valve (13), the car speed sensor (14) is adapted to detect a car speed and transmit a pulse signal produced as a result of the detection (a pulse signal corresponding to a car speed to the control apparatus (15), and the control apparatus (15) is adapted to send a current corresponding to the pulse signal (a current corresponding to a car speed which varies from a zero current (i=0) upon a predetermined high speed to a maximum current (i=1) upon stoppage) to an electromagnetic coil (solenoid) (57) of the flow rate control valve (13) and hold a plunger (52) and a spool (51) of the flow rate control valve (13) at a predetermined position corresponding to the aforementioned current value.

Next, the above-referred oil path switching valve (2), change-over valve (11), pressure control valve (12) and flow rate control valve (13) will be described in more detail with reference to FIGS. 2 to 21. Reference numeral (20) in FIGS. 2 to 7 designates a valve housing, and the above-mentioned respective valves (2), (11), (12) and (13) are assembled within the same valve housing (20). Explaining, at first, the oil path switching valve (2) in detail with reference to FIG. 2, reference numeral (21) designates an input shaft which is manipulated by a steering wheel (not shown), numeral (23) in FIGS. 2 and 3 designates a cylinder block forming an output shaft which is rotatably supported within the valve housing (20) by means of upper and lower bearings, numeral (22) designates a torsion bar inserted within the above-mentioned input shaft (21), which is fixedly secured at its top to the input shaft (21) and at its bottom to the cylinder block (23), and owing to torsion of the torsion bar (22) the input shaft (21) and the cylinder block (23) are allowed to have a relative rotational angle difference therebetween. In addition, reference numeral (21a) designates a plurality of longitudinal grooves provided on the outer peripheral surface of the lower portion of the input shaft (21), in the cylinder block (23) are provided cylinders as opposed to the respective longitudinal grooves (21a), the aforementioned reaction pistons (5) are fitted in the respective cylinders, and projections provided at the tip ends of the respective reaction pistons (5) are engaged with the corresponding longitudinal grooves (21a). The chambers (6) on the rear side of the respective reaction pistons (5) are formed between the cylinder block (23) and the valve housing (20) and communicated with an annular groove (6').

Reference numeral (23a) designates a pinion formed integrally with the cylinder block (23), numeral (24a) designates a rack which is meshed with the pinion (23a) and in turn coupled to a piston rod of the power cylinder (3), numeral (24) designates a rack support, numeral (26) designates a cap, numeral (25) designates a spring interposed between the cap (26) and the rack support (24), numeral (28) designates a sleeve of the oil path switching valve (2) fixed within the valve housing (20) right above the aforementioned cylinder block (23), numerals (28a), (28b) and (28c) designate oil paths provided on the outer peripheral surface of the sleeve (28), numeral (27) designates a valve body fitted between the sleeve (28) and the input shaft (21), numeral (23b) designates a pin for connecting a bottom end portion of the valve body (27) with a top end portion of the cylinder block (23), and numerals (27a), (27b) and (27c) designates oil paths provided on the outer peripheral surface of the valve body (27).

In the above-mentioned construction, when a steering wheel is placed at a neutral position, the high pressure oil path (7a) communicates with a chamber (29) between the input shaft (21) and the torsion bar (22) through the oil path (27a) in the valve body (27) and the oil path (28a) in the sleeve (28), and hence working oil supplied from the oil pump (1) will circulate through the route consisting of the high pressure oil path (7a)→ the oil path (28a)→the oil path (27a)→the chamber (29) (the oil paths between the oil path (27a) and the chamber (29) being not shown)→the low pressure oil path (8a)→the oil tank (4)→the oil pump (1). If the input shaft (21) is rotated in the clockwise direction as viewed from the above relatively to the valve body (27) by rotating a steering wheel in the right turn direction, then the high pressure oil path (7a) communicates with the oil path (9a) for the power cylinder (3) through the oil path (28a) of the sleeve (28), the oil paths (27a) and (27b) of the valve body (27) and the oil path (28b) of the sleeve (28), while the low pressure oil path (8a) communicates with the oil path (10a) for the power cylinder (3) through the chamber (29), the oil path (27c) of the valve body (27) and the oil path (28c) of the sleeve (28), and hence the working oil supplied from the oil pump (1) is passed through the route consisting of the high pressure oil path (7a)→the oil path (28a)→the oil paths (27a) and (27b)→the oil path (28b) the oil path (9a)→the left chamber of the power cylinder (3), while the oil in the right chamber of the power cylinder (3) is returned through the route of the oil path (10a)→the oil path (28c)→the oil path (27c)→the chamber (29)→the low pressure oil path (8a)→the oil tank (4), so that the piston rod of the power cylinder (3) moves rightwardly, and thus steering in the right turn direction can be effected. On the other hand, if the input shaft (21) is rotated in the anticlockwise direction as viewed from the above relatively to the valve body (27) by rotating a steering wheel in the left turn direction, then the high pressure oil path (7a) communicates with the oil path (10a) for the power cylinder (3) through the oil path (28a) of the sleeve (28), the oil path (27c) of the valve body (27) and the oil path (28c) of the sleeve (28), while the low pressure oil path (8a) communicates with the oil path (9a) for the power cylinder (3) through the chamber (29), the oil path (27b) of the valve body (27) and the oil path (28b) of the sleeve (28), and hence the working oil supplied from the oil pump (1) is passed through the route consisting of the high pressure oil path (7a)→the oil path (28a)→the oil path (27c)→the oil path (28c)→the oil path (10a)→the right chamber of the power cylinder (3), while the oil in the left chamber of the power cylinder is returned through the route of the oil path (9a)→the oil path (28b)→the oil path (27b)→the chamber (29)→the low pressure oil path (8a) the oil tank (4), so that the piston rod of the power cylinder (3) moves leftwardly, and thus steering in the left turn direction can be effected.

When a steering wheel is rotated by a certain fixed angle in a desired direction, as described above the piston rod of the power cylinder (3) is moved in the left or right direction as a result of a relative angular displacement between the input shaft (21) and the output shaft (23) and thereby steering in the desired direction can be effected. During this movement of the piston rod, since the piston rod of the power cylinder (3) is coupled to the rack (24a) as referred to previously, the output shaft (23) is rotated via the rack (24a) and the pinion (23a) in the direction for following the rotation of the input shaft (21) until the relative angular displacement therebetween becomes zero, that is, the torsion of the torsion bar (22) becomes zero, when the supply route of the working oil to the power cylinder (3) is cut off in the oil path switching valve (2), and hence the power steering system holds a steering condition of a fixed angle. On the contrary, when the steering wheel is returned from the steering position of the fixed angle to a neutral position, also a similar operation is effected. Such a structure and an operation of the oil path switching valve in a power steering system has been well known in the prior art, and the details of the structure and operation are disclosed, for instance, in U.S. Pat. No. 3,800,407 granted to P. J. Dumeah on Apr. 2, 1974.

Now, the change-over valve (11) forming oil pressure increase means will be described in more detail. As will be apparent from FIGS. 4 and 7, the change-over valve (11) is interposed in the midway of the bypassing oil path (7b) for the orifice (a). This change-over valve (11) includes a spool (30) having an annular groove (30a) (this annular groove (30a) forming a part of the oil path (7b)), a cap (31), a spring (33) interposed between these spool (30) and cap (31), and an O-ring (34). Here it is to be noted that in FIG. 4 the spool (30) is shown at its position occupied upon low speed driving and when steering is effected upon high speed driving, while in FIG. 7 it is shown at its position occupied when steering is not effected upon high speed driving. The arrangement for the spool (30) is such that if the oil pressure in the pilot oil path ($7e_1$) (See FIGS. 1 and 8(I)) rises, then the spool (30) may advance against the spring (33) to open the bypassing oil path (7b), while if the oil pressure in the pilot oil path ($7e_1$) lowers, then the spool (30) may retract as pushed by the spring (33) to close the bypassing oil path (7b).

Next, the above-referred pressure control valve (12) will be explained in more detail. As will be apparent from FIGS. 5, 6 and 8(I), the pressure control valve (12) includes a sleeve (40), a spool (41), a cap (42), a stopper (43), a spring (44) interposed between the spool (41) and the stopper (43), and a member (45) fixedly mounted within the spool (41) and having a first orifice (d). As shown in FIGS. 9, 10, 19 and 20, the spool (41) is provided with three annular grooves (41a), (41b) and (41c), and the annular groove (41a) is opposed to the oil path (7c) branched from the bypassing oil path (7b) on the upstream side of the change-over valve (11). In addition, reference numeral (41d) designates a chamber extending upwardly from the first orifice (d) within the spool (41), numeral (41e) designates an oil path connecting the chamber (41d) with the above-mentioned annular groove (41c) (these oil paths (41d), (41e) and (41c) forming a part of the low pressure oil path (8b)), and the annular groove (41c) is opposed to the low pressure oil path (8b) on the side of the valve housing (20) which oil path extends obliquely downwards as shown in FIG. 6 from the low pressure oil path (8a) formed right above the valve body (27) of the oil path switching valve (2) shown in FIG. 2.

The above-mentioned annular groove (41a) communicates with the chamber (41d) through an orifice (e). The sleeve (40) is provided with a notch (40a) having a through-hole (40a'), a notch (40b) having a through-hole (40b'), a notch (40c) having through-holes (40c') and (40c''), a notch (40d) having a second orifice (b), and a notch (40e) having a through-hole (40e') in succession from the above to the below with different phases in the circumferential direction on its outer peripheral surface, as shown in FIGS. 11 to 17.

The aforementioned respective annular grooves (41a), (41b) and (41c) are arranged relative to the spool (41) in such manner that the notch (40a) having the through-hole (40a') may connect the annular groove (41c) of the spool (41) with the low pressure oil path (8b) on the side of the valve housing (20), the notch (40b) having the through-hole (40b') may connect the annular groove (41a) of the spool (41) with the oil path (7c) on the side of the valve housing (20), the notch (40c) having the through-holes (40c') and (40c'') may connect the annular grooves (41a) and (41b) of the spool (41) with each other, the notch (40d) having the second orifice (b) may connect the annular groove (41b) of the spool (41) with the oil path (7e) on the side of the valve housing (20), and the notch (40e) having the through-hole (40e') may connect the annular groove (41b) of the spool (41) with the oil path (7d) on the side of the valve housing (20) shown in FIGS. 3 and 5. In addition, the arrangement is such that the working oil flowing out through the first orifice (d) into the chamber (41d) of the spool (41) may return to the oil tank (4) through the route consisting of the oil path (41e)→the annular groove (41c)→the through-hole (40a')→the notch (40a)→the low pressure oil path (8b) on the side of the valve housing (20), that the working oil flowing from the bypassing oil path (7b) through the oil path (7c) into the notch (40b) may flow towards the flow rate control valve (13) and the reaction pistons (5) through the route consisting of the through-hole (40b')→the annular groove (41a)→the notch (40c)→the through-hole (40c'')→the annular groove (41b)→the through-hole (40e')→the notch (40e)→the oil path (7d) in the valve housing (20), and that the working oil may further flow from the above-mentioned notch (40c) through the oil path (7d₂) towards the reaction pistons (5). Furthermore, a part of the working oil flowing through the above-mentioned annular groove (41b) passes through the route consisting of the orifice (b)→the notch (40d)→the oil path (7e) on the side of the valve housing (20) to act upon the rear side of the spool (30) in the above-mentioned change-over valve (11) as a pilot pressure (See (7e₁) in FIG. 5), and further it flows towards the flow rate control valve (13) through the route consisting of the oil path (30b) (See FIG. 8(I))→the oil path (7e) on the side of the valve housing (20).

Now, the above-referred flow rate control valve (13) will be explained in greater detail. As will be apparent from FIGS. 5, 8 and 21, the flow rate control valve (13) is disposed right under the above-described pressure control valve (12) with their axes aligned with each other. The flow rate control valve (13) includes a sleeve (50), a spool (51), a plunger (52) made of non-magnetic material, a member (53) made of magnetic material that is integral with the plunger (52), a lock nut (54) for fixedly fastening the spool (51) to the plunger (52), a washer (55) butting against the sleeve (40) of the above-described pressure control valve (12), a back-up spring (56) interposed between the washer (55) and the sleeve (50), an electromagnetic coil (57), a nut (58) fixedly mounted to a casing on the side of the electromagnetic coil (57), a plunger pushing force regulation bolt (59) threadedly engaged with the nut (58), a spring (60) interposed between the bolt (59) and the plunger (52), and a lock nut (61) for fixedly fastening the assembly of the above-described flow rate control valve (13) to the valve housing (20). As shown in FIG. 21, the sleeve (50) is provided with an annular oil path (50a) communicating with the oil path (7d) on the side of the valve housing (20) (See FIG. 5) and an annular oil path (50b) communicating with the oil path (7e) on the side of the valve housing (20), and in the oil path (50b) is formed an orifice (c). In addition, the above-mentioned spool (51) is provided with an annular oil path (51a) formed along the entire circumference and having a tilted groove (51a') which is formed along only a part of the circumference, and a through-hole (51b), and the above-mentioned plunger (52) is provided with an oil path (52a) communicating with the through-hole (51b), a through-hole (52b) and an oil path (52c) directed in the axial direction.

As described previously, the working oil flowing from the oil path (7d) on the side of the valve housing (20) through the oil path (7e') towards the flow rate control valve (13) enters the oil path (50a) in FIG. 21, while the working oil flowing through the oil path (7e) on the valve housing (20) shown in FIG. 5 towards the flow rate control valve (13) enters the oil path (50b) in FIG. 21. FIG. 21 shows the condition of high speed driving, where only the working oil entering the oil path (50b) would flow towards the member (45) on the side of the orifice (d) through the route consisting of the orifice (c) the oil path (51a)→the through-hole (51b)→the oil path (52a)→the through-hole (52b)→the oil path (52c). However, when the condition changes from a high speed driving condition to a low speed driving condition, the spool (51) lowers, and thereby the amount of opening of the orifice (c) is decreased, while the amount of opening of the oil path (50a) is increased. Eventually, under a stop condition, only the oil path (50a) is opened.

Reference symbol $Q_o$ in FIG. 1 represents a flow rate on the delivery side of the oil pump (1), symbol $Q_1$ represents a flow rate of an oil flow entering the oil path switching valve (2) through the high pressure oil path (7a), symbol $Q_2$ represents a flow rate through the oil path (7c), symbol $Q_3$ represents a flow rate through the oil path (7e') (the oil path (50a)), symbol $Q_4$ represents a flow rate on the downstream side of the orifice (c), symbol $Q_5$ represents a flow rate on the downstream side of the orifice (e), and the ratio of $Q_1:Q_2$ is equal to about 6:1. In addition, the flow rate $Q_2$ through the oil path (7c) fulfils the equation of $Q_2=Q_3+Q_4+Q_5$ (See FIG. 31).

The diameter of the sleeve (50) of the flow rate control valve (13) is varied at its upper, middle and lower portions as shown in FIG. 21, the diameters being successively reduced towards the upper portion and differences ($D_1$) and ($D_2$) are present therebetween. On the other hand, the sleeve fitting bore on the side of the valve housing is also provided so as to conform with the sleeve. Such provision is made for the purpose of facilitating to insert the sleeve (50) into the sleeve fitting bore by reducing a frictional resistance upon inserting the sleeve (50) associated with O-rings (62) into the valve housing (20), and also for the purpose of preventing the respective O-rings (62) from being forced out and being bitten between the sleeve (50) and the valve housing (20) upon insertion of the sleeve (50).

In FIGS. 22, 23 and 24 is shown a filter (70). This filter (70) consists of a frame (71) and a wire netting (72), and is mounted by fitting at the notch (40b) provided in the sleeve (40) of the pressure control valve (12) (See FIGS. 9 and 13), that is, at the inlet of the control system oil path to prevent foreign matters such as dust from entering the control system oil path. It is to be noted that although such type of filter could be disposed at the inlet of the high pressure oil path (7a) provided in the valve casing (20) (See the portion marked by an arrow in FIG. 4), in that case it is necessary to make the filter large-sized because the total delivery flow rate of the oil pump passes through the filter, and so, it is difficult to accommodate such a large-sized filter by making use of the illustrated space.

It is also to be noted that the reason why the inlet of the high pressure oil path (7a) is made large in diameter is for the purpose of facilitating machining of the orifice (a) and the oil path (7b) branched in two directions by inserting a drill through this inlet and also for the purpose of facilitating coupling work with a piping (not shown). In addition, other oil paths such as (7b) [the oil path (7b) on the downstream side of the change-over valve (11)], (7c), (7d) and (7e) are also formed by drilling bores in the longitudinal and lateral directions in the valve housing (20) and then plugging the bores as will be seen in FIGS. 3, 4 and 5, and in this respect also, machining of the oil paths is facilitated. It is to be noted that reference character (Z) in FIGS. 2, 3, 4, 6 and 7 designates a center axis of the oil path switching valve (2) and character ($Z_1$) in FIGS. 2 and 5 designates a center of meshing between the pinion (23a) and the rack (24a).

One example of the above-referred control apparatus (15) is shown in FIG. 25. Reference numeral (80) designates a constant voltage power supply circuit, numeral (81) designates a pulse-voltage converter circuit for sending a voltage proportional to a car speed, numeral (82) designates an error amplifier circuit, numeral (83) designates a transistor, numeral (84) designates a reset circuit which resets a timer circuit (87) at a car speed other than zero and which sets the timer circuit (87) at a zero car speed, numeral (85) designates a pulse-voltage converter circuit for sending a voltage proportional to a rotational speed of an engine, numeral (86) designates an engine rotational speed set circuit which sets the timer circuit (87) into a start condition when the engine rotational speed is equal to or higher than 2000 rpm and resets the timer circuit (87) into an OFF condition when the engine rotational speed is lower than 2000 rpm, numeral (88) designates a car speed input wire cut-off detector circuit which takes an ON condition upon absence of car speed pulses, numeral (89) designates a transistor, numeral (90) designates a relay, and numeral (91) designates a negative feedback circuit for stabilizing the current flowing through the electromagnetic coil (57) of the flow rate control valve (13). In general, the condition where the engine rotational speed is equal to or higher than 2000 rpm at a zero car speed, cannot exist normally. Therefore, if this condition should continue 5-10 seconds or more, then it is judged that any fault (for instance, a fault in the car speed pulse system or a fault in a flow rate control valve system) has arisen, and feed of a current to the flow rate control valve (13) (the electromagnetic coil (57)) is interrupted by turning the relay (90) ON.

Accordingly, owing to this control circuit, current feed to the flow rate control valve (13) is interrupted upon fault, and hence manipulation of a steering wheel becomes heavy upon high speed driving (providing a fail-safe function), resulting in a safe operation.

Next, the operation of the above-described power steering system will be explained. When the steering wheel is rotated from its neutral position in the right-turn or left-turn direction and thereby the relative angular displacement of the input shaft (21) with respect to the valve body (27) is increased, then the output oil pressure of the oil path switching valve (2) (the delivery pressure of the oil pump (1)) $P_p$ will rise along a quadratic curve as shown in FIG. 26. The influence of this delivery pressure $P_p$ of the oil pump (1) appears in itself in the oil path (7d) which is on the downstream side of the oil paths (7a), (7b) and (7c) and the pressure control valve (12) and which is on the upstream side of the orifices (b) and (e), the flow rate control valve (13) and the chambers (6) associated with the reaction pistons (5), and hence the oil pressure in the oil path (7d) rises in a similar manner.

The above-mentioned pressure control valve (12) controls the delivery pressure $P_p$ of the oil pump (1) according to a pilot pressure in the auxiliary pilot oil path ($7d_1$) on the downstream side of the valve itself to produce a controlled oil pressure $P_c$ which is limited to be equal to or lower than a highest oil pressure, and also the valve (12) controls the highest pressure of the controlled oil pressure $P_c$ as shown in FIG. 29 according to a main pilot oil pressure in the oil path ($7f_1$) on the downstream side of the flow rate control valve (13).

If the car is in a stopped condition, then the control apparatus (15) sends a current of $i=1A$ (See FIG. 29) to the flow rate control valve (13) in response to a pulse signal applied from the car speed sensor (14) and thereby the plunger (52) and the spool (51) are lowered to the lower limit position (moved up to the position L in FIG. 1), so that only the oil path (50a) in FIG. 21 is communicated with the oil path (7f) on the upstream side of the orifice (d) via the oil paths (51a), (51b) and (52b) on the side of the spool (51) to make the oil pressure in the oil path (7f) equal to the oil pressure $P_c$ in the oil path (7d). Under the above-mentioned stopped condition, if the steering wheel begins to be rotated in the right-turn (or left-turn) direction, then the oil pressure $P_c$ in the oil path (7d) begins to rise. Then the oil pressure in the oil path (7f) also rises in a similar manner. This oil pressure is in itself transmitted to the spool (41) (the smaller diameter end of the spool (41)) of the pressure control valve (12) via the main pilot oil path (7f1), and so the spool (41) is pushed in the direction of arrows in FIG. 9(II). At the same time, the working oil passing through the annular groove (41b) of the spool (41) pushes the spool (41) in the direction of arrows in FIG. 9(II) owing to a difference in a pressure acting area. On the other hand, the side of the spring (44) communicates with the low pressure oil path (8b), hence the spool (41) rises successively (moves in the direction of L in FIG. 1) against the spring (44), the extent of opening of the through-hole (40b') decreases successively, and when the above-mentioned oil pressure pushing the spool (41) upwardly and the resilient force of the spring (44) balance with each other, the spool (41) will stop. Under this condition, the maximum value of the oil pressure $P_c$ in the oil path (7d) (in the chambers (6) associated with the reaction pistons (5)) becomes lowest. If the steering wheel is further rotated in the right-turn (or left-turn) direction and the oil pressure $P_p$ in the oil paths (7a), (7b) and (7c) rises further, then in the pressure control valve (12) the spool (41) is moved in the direction of further reducing the extent of opening of the through-hole (40b') owing to a difference in a pressure acting area for the oil pressure $P_p$ acting upon the annular groove (41b), and so the oil pressure $P_c$ in the oil path (7d) is continuously maintained at the above-mentioned constant low level. Accordingly, when the above-mentioned relative angular displacement is increased and thereby a large output oil pressure $P_p$ is provided, the steering wheel torque T which is determined by the oil pressure $P_c$ in the chambers (6) associated with the reaction pistons (5) and the torsion angle of the torsion bar (22), would not become large (See Curve (A) in FIG. 27). In the above-mentioned case of steering under a stopped condition, although the oil pressure $P_c$ in the oil path (7d) is low as described previously, since the spool (51) (See FIG. 21) is at a lowered position, the fourth orifice (c) is blocked and the working oil would not flow through the oil path (7e). Accordingly, the oil pressure in the COV pilot oil path (7e1) becomes the same pressure as the pressure $P_c$, hence owing to this pressure the change-over valve (11) opens the by-passing oil path (7b) against the resilient force of the spring (33), and the valve (11) is held at the position L in FIG. 1. It is to be noted that in FIG. 1 the change-over valve (11) is illustrated at its position H.

If the car is brought into a low speed driving condition, the control apparatus (15) receives a pulse signal sent from the car speed sensor and sends a current corresponding to the car speed at each moment such as, for instance, a current of i=0.8A to the flow rate control valve (13) to raise the plunger (52) and the spool (51) from the lower limit position by a distance corresponding to the above-mentioned current value (to move them in the rightward direction in FIG. 1) and thereby decrease the amount of opening of the oil path (80a) on the side of the sleeve (80) shown in FIG. 21. At this moment, the orifice (c) and the oil path (80b) on the side of the sleeve (80) are still kept blocked, and owing to the decrease of the amount of opening of the oil path (80a), the flow rate $Q_3$ passing through the orifice (d) is reduced as compared to the flow rate passing through the oil path (80a) under the above-mentioned stopped condition (the flow rate $Q_4$ being nearly zero under this condition). It is to be noted that the amount of this flow rate decrease is absorbed by an increase of the flow rate $Q_5$ of the flow passing through the orifice (e) to the low pressure oil path (8b). Since the flow rate $Q_3$ ($Q_4 \approx 0$) of the flow coming out of the flow rate control valve (13) is reduced as compared to the flow rate of the flow passing through the oil path (50a) under the above-mentioned stopped condition as described above, the oil pressure on the upstream side of the orifice (d) becomes lower than that under the stopped condition.

If the steering wheel begins to be rotated in the right-turn (or left-turn) direction under the above-described low speed condition, then the oil pressure $P_c$ in the oil path (7d) begins to rise. Then the main pilot oil pressure in the oil path (7f) would also rise. This oil pressure is in itself transmitted via the main pilot oil path (7f1) to the spool (41) (the smaller diameter end of the spool (41)) of the pressure control valve (12), and so the spool (41) is pushed in the direction of arrows in FIG. 9(II). At the same time, the working oil passing through the annular groove (41b) of the spool (41) pushes the spool (41) in the direction of arrows in FIG. 9(II) owing to a difference in a pressure acting area. On the other hand, the side of the spring (44) communicates with the low pressure oil path (8b), hence the spool (41) rises successively (moves in the direction of L in FIG. 1) against the spring (44), the extent of opening of the through-hole (40b') decreases successively, and when the above-mentioned oil pressure pushing the spool (41) upwardly and the resilient force of the spring (44) balance with each other, the spool (41) will stop. However, the oil pressure pushing the smaller diameter end of the spool (41) is lower than that under the above-described stopped condition, hence the distance of rise of the spool is decreased by the corresponding amount (the extent of opening of the through-hole (40b') being increased by the corresponding amount), and the oil pressure $P_c$ in the oil path (7d) and the chambers (6) associated with the reaction pistons (5) becomes higher than that under the above-mentioned stopped condition. This condition still continues thereafter, that is, if the steering wheel is further rotated in the right-turn (or left-turn) direction resulting in further rise of the oil pressure $P_p$ in the oil paths (7a), (7b) and (7c) and the oil pressure in the annular groove (41b) tends to increase, then in the pressure control valve (12) the spool (41) is further moved to limit the extent of opening of the through-hole (40b'), and hence, the oil pressure $P_c$ in the oil path (7d) is continuously maintained at a constant level which is higher than that under the stopped condition.

Accordingly, when a large delivery pressure $P_p$ is provided by increasing the above-mentioned relative angular displacement, though the steering wheel torque T becomes larger than that under the stopped condition, it does not become so large as that under the high speed condition as will be described later.

If the car is brought into a high speed condition at a predetermined speed, then the control apparatus (15) sends a current of i=0 (See FIG. 29) to the flow rate control valve (13) in response to a pulse signal transmitted from the car speed sensor (14), to raise the plunger (52) and the spool (51) up to its upper limit position (to move them up to the position H illustrated in FIG. 1) by means of the spring (60), and thereby only the fourth orifice (c) in FIG. 21 is communicated with the oil path (7f) on the upstream side of the first orifice (d) via the oil paths (51a), (51b) and (52b) on the side of the spool (51).

At this moment, the fourth orifice (c) is fully opened, and while the flow rate $Q_4$ through the fourth orifice (c) is increased, it is increased only a little as compared to the flow rate under the above-mentioned low speed condition. On the other hand, the flow rate $Q_3$ through the oil path (50a) becomes nearly zero, and therefore, the flow rate through this system becomes minimum. It is to be noted that this decrease of the flow rate is absorbed by further increase of the flow rate $Q_5$ of the oil flow through the third orifice (e) to the low pressure oil path (8b) (See FIG. 31). Since the flow rate of the oil flow coming out of the flow rate control valve (13) is reduced to the minimum is described above, the main pilot oil pressure in the oil path (7f) on the upstream side of the first orifice (d) becomes lowest. As this oil pressure is fed to the pressure control valve (12) via the oil path (7f_1), the highest pressure of the oil pressure $P_c$ whose highest pressure is limited by the pressure control valve (12) takes the maximum value (See FIG. 24).

If the steering wheel begins to be rotated in the right-turn (or left-turn) direction under the above-mentioned high speed condition, then the oil pressure $P_c$ in the oil path (7d) begins to rise. Then the oil pressure in the oil path (7f) also rises. However, since the oil path (50a) is blocked, the amount of the pressure rise is extremely small. This oil pressure is in itself transmitted to the spool (41) (the smaller diameter end of the spool (41)) of the pressure control valve (12) via the main pilot oil path (7f_1), and so the spool (41) is pushed in the direction of arrows in FIG. 9(II). At the same time, the working oil passing through the annular groove (41b) of the spool (41) pushes the spool (41) in the direction of arrows in FIG. 9(II) owing to a difference in a pressure acting area. On the other hand, the side of the spring (44) communicates with the low pressure oil path (8b), hence the spool (41) will rise successively (move in the direction L in FIG. 1) against the spring (44), resulting in successive reduction of the extent of opening of the through-hole (40b'), and when the oil pressure pushing the spool (41) in the above-mentioned direction of arrows balances with the resilient force of the spring (44), the spool (41) will stop. However, the oil pressure pushing the smaller diameter end of the spool (41) is lowest, hence the distance of rise of the spool (41) is very small (the extent of opening of the through-hole (40b) being large), and the highest pressure for the oil pressure $P_c$ in the oil path (7d) (in the chambers (6) associated with the reaction pistons (5)) becomes highest.

On the other hand, as the orifice (c) is opened to the oil path (51a), when the delivery pressure $P_p$ itself is low, especially in the case where the steering wheel is in the proximity of its neutral position, the COV pilot pressure in the oil path (7e) between the orifices (b) and (c) is lowered, and this lowered pressure is transmitted to the spool (30) of the change-over valve (11) via the COV pilot oil path (7e_1), accordingly the spool (30) is lowered (the position H in FIG. 1 being selected) to close the bypassing oil path (7b), so that the working oil supplied from the oil pump (1) is sent to the oil path switching valve (2) via the main orifice (a) and the delivery oil pressure $P_p$ is raised by a preset pressure. This implies that even when steering is not effected (the steering wheel being held at its neutral position) under a high speed condition, the delivery pressure $P_p$ in the oil paths (7a), (7b) and (7c) rises as compared to that under a stopped condition or a low speed condition (See $P_{p1}$ in FIG. 27). This oil pressure is transmitted to the chambers (6) associated with the reaction pistons (5) via the pressure control valve (12) and the oil paths (7d) and (7d_2), and so the reaction feeling (reaction to the hands) upon minute angle steering under a high speed condition can be improved.

If the steering wheel is further rotated continuously in the right-turn (or left-turn) direction, the delivery pressure $P_p$ in the oil paths (7a), (7b) and (7c) rises further and the oil pressure $P_c$ in the oil path (7d) also rises further in a similar manner to that described above. If the oil pressure in the oil path (7e) between the orifices (b) and (c) rises higher than a preset value and thus the force acting upon the spool (30) via the pilot oil path (7e_1) becomes larger than the resilient force of the spring (33), then the spool (30) of the change-over valve (11) rises (the position L in FIG. 1 being selected) to open the bypassing oil path (7b). If the steering wheel is further rotated continuously in the right-turn (or left-turn) condition even after the above-mentioned condition has been realized, then the oil pressure $P_p$ in the oil paths (7a), (7b) and (7c) will rise further. However, the pressure control valve (12) controls the extent of opening of the through hole (40b'), and hence the oil pressure $P_c$ in the oil path (7d) can be continuously maintained at the highest constant level. Accordingly, the steering wheel torque T for providing a large delivery pressure $P_p$ by increasing the above-mentioned relative angular displacement becomes large (See curve (B) in FIG. 27).

As described above, the power steering system according to the present invention comprises, in a power steering system of the type that movement of a steering wheel is transmitted via a torsion bar (22) to an oil path switching valve (2) to actuate a power cylinder (3) in a desired steering direction by switching a high pressure oil path (7a) extending from an oil pump (1) to the oil path switching valve (2) and a low pressure oil path (8a) extending from the same oil path switching valve (2) to an oil tank (4) and a part of working oil flowing through the high pressure oil path (7a) is led to a reaction piston (5) to restrain torsion of the torsion bar (22), parallel oil paths (7e) and (7e') branched from the midway of the oil paths (7a), (7b) and (7c), a second orifice (b) provided in one (7e) of the parallel oil paths (7e) and (7e'), a flow rate control valve (13) for discharging the working oil fed from the parallel oil paths according to a car speed so as to be proportional to the latter, a first orifice (d) for generating a main pilot pressure depending upon a flow rate on the downstream side of the same flow rate control valve (13), and a pressure control valve (12) actuated by the same main pilot pressure for controlling the oil pressure in the oil path (7d) extending to the above-mentioned reaction piston (5) to be constant and to take a higher constant value as a car speed is raised, and hence upon steering under a stopped condition the oil pressure applied to the reaction piston (5) becomes minimum. Therefore, upon steering under a stopped condition, one can drive the oil path switching valve (2) with only a small steering force (steering wheel torque).

In addition, as a car speed rises, the oil pressure applied to the reaction piston (5) is raised. Therefore, under a high speed condition the oil path switching valve (2) must be driven with a relatively large steering force, and so, under a high speed condition an appropriate reaction to hands (feeling of a reaction force) can be obtained.

Furthermore, since the output pressure (the delivery pressure of the pump) $P_p$ is led to the reaction piston (5) via the pressure control valve (12), the output oil pressure $P_p$ presents a linear characteristic with respect to a steering wheel torque T within a range of steering under a running condition as shown by curve (B) in FIG. 27. Accordingly, the feeling of oversteering as is often encountered in the case of the conventional power steering system is not present, hence steering under a running condition is extremely stabilized, and steering matched with the steering feeling can be realized.

Moreover, under a high speed condition, even if a steering wheel is in a neutral condition, as the oil pressure applied to the reaction piston (5) can be raised by a predetermined value by means of the change-over valve (11), the neutral feeling of the steering wheel can be obtained under a high speed condition.

Furthermore, when large steering is effected by manipulating the steering wheel under a high speed condition, since the change-over valve (11) is actuated to open the bypassing oil path (7b), it is possible to make the output oil pressure $P_p$ act upon the power cylinder (3) via the oil path switching valve (2) without generating a reaction loss. In essence, although the pressure rise caused by the orifice (a) and closure of the change-over valve (11) is effective for improving the feeling of reaction under a high speed condition, it will cause a pressure loss for the power cylinder (3). However, according to the present invention, it is possible not to generate a pressure loss upon steering under a high speed condition where an output higher than a predetermined value is necessitated for the power cylinder (3) and to reliably enhance the feeling of reaction only in the proximity of the neutral position of the steering wheel where the output oil pressure is low and thereby improve the feeling of rigidity.

As described above, the power steering system according to the present invention comprises, in a power steering system of the type that movement of a steering wheel is transmitted via a torsion bar (22) to an oil path switching valve (2) to actuate a power cylinder (3) in a desired steering direction by switching a high pressure oil path (7a) extending from an oil pump (1) to the oil path switching valve (2) and a low pressure oil path (8a) extending from the same oil path switching valve (2) to an oil tank (4) and a part of working oil flowing through the high pressure oil path (7a) is led to a reaction piston (5) to restrain torsion of the torsion bar (22), parallel oil paths (7e) and (7e') branched from the midway of the oil paths (7a), (7b) and (7c), a second orifice (b) provided in one (7e) of the parallel oil paths (7e) and (7e'), a flow rate control valve (13) for discharging the working oil fed from the parallel oil paths according to a car speed so as to be proportional to the latter, a first orifice (d) for generating a main pilot pressure depending upon a flow rate on the downstream side of the same flow rate control valve (13), a pressure control valve (12) actuated by the same main pilot pressure for controlling the oil pressure in the oil path (7d) extending to the above-mentioned reaction piston (5) to be constant and to take a higher constant value as a car speed is raised, and an orifice (e) for regulating the flow rate of the oil flow from the downstream side of the same pressure control valve (12) to the low pressure oil path (8b) according to increase and decrease of the flow rate of the oil flow from the first orifice (d) on the downstream side of the above-mentioned flow rate control valve (13) in such manner that if the latter is decreased the former may be increased and vice versa, and therefore, the above-mentioned effects can be achieved.

Moreover, although the flow rate of the working oil from the high pressure oil path (7a) to the oil path switching valve (2) becomes constant and thus a control characteristic of the oil path switching valve (2) can be stabilized if the flow rate of the flow of the working oil from the high pressure oil path (7a) to the reaction piston (5), according to the present invention since there is provided an orifice (e) for regulating the flow rate of the oil flow from the downstream side of the same pressure control valve (12) to the low pressure oil path (8b) according to increase and decrease of the flow rate of the oil flow from the first orifice (d) on the downstream side of the above-mentioned flow rate control valve (13) in such manner that if the latter is decreased the former may be increased and vice versa, and therefore, the total flow rate of the oil flow from the oil path for the reaction piston (5) to the low pressure oil path (the flow rate of the working oil flowing from the high pressure oil path to the reaction piston) can be maintained nearly constant, and so there is the effect that a control characteristic of the oil path switching valve (2) can be stabilized.

As described above, the power steering system according to the present invention comprises, in a power steering system of the type that movement of a steering wheel is transmitted via a torsion bar (22) to an oil path switching valve (2) to actuate a power cylinder (3) in a desired steering direction by switching a high pressure oil path (7a) extending from an oil pump (1) to the oil path switching valve (2) and a low pressure oil path (8a) extending from the same oil path switching valve (2) to an oil tank (4) and a part of working oill flowing through the high pressure oil path (7a) is led to a reaction piston (5) to restrain torsion of the torsion bar (22), an oil filter (70) at the most upstream position of a control hydraulic oil system branched from the midway of the above-mentioned high pressure oil path (7a) to the above-mentioned reaction piston (5), and therefore, the following effects can be achieved. Although such type of filter could be disposed at an inlet (See the portion marked by an arrow in FIG. 4) of the high pressure oil path (7a) provided in the valve casing (20) for the purpose of preventing foreign matters such as dust or the like from entering the oil path of the control system, in that case it is necessary to make the filter large-sized because the total flow rate of the oil flow delivered from the pump passes through the filter. Whereas, according to the present invention, the filter (70) shown in FIGS. 22, 23 and 24 is mounted by fitting at the notch (40b) (See FIGS. 9 and 13) provided in the sleeve (40) of the pressure control valve (12), that is, at the inlet (the most upstream position) of the oil path of the control system as described above, and so, there is an effect that invasion of foreign matters such as dust or the like into the oil path of the control system can be prevented without using a large-sized filter.

In addition, the power steering system according to the present invention has the effect that a power steering system having the aforementioned functions can be manufactured in a compact form, owing to the facts that the above-described respective valves (2), (11), (12) and (13) are assembled in the same valve housing (20), that the valve body (27) of the above-described oil path switching valve (2) is disposed on the axis of the input shaft (21) on the steering wheel side, that the above-described flow rate control valve (13) and the above-described pressure control valve (12) are disposed in series on another axis which is parallel to the axis of the same input shaft (21) and that the above-described change-over valve (11) is disposed on still another axis which is parallel to the same input shaft, as described above.

Furthermore, the power steering system according to the present invention has the effect that flow rate control by the flow rate control valve (13) which discharges the working oil supplied through the parallel oil paths (7e) and (7e') according to a car speed so as to be proportional to the latter can be achieved smoothly, owing to the facts that the sleeve (50) of the above-described flow rate control valve (13) is provided with two oil paths (50a) and (50b) which penetrate through the sleeve (50) and are connected to the aforementioned parallel oil paths (7e) and (7e'), respectively, and that on the outer peripheral surface of the spool (51) of the same flow rate control valve (13) is provided the oil path (51a) which selectively connects with one of the above-described respective oil paths (50a) and (50b) and which decreases the extent of opening of one of the above-described respective oil paths and increases the extent of opening of the other oil path when the same spool (51) moves in the axial direction, as described above.

Still further, the power steering system according to the present invention can achieve the following effects owing to the fact that the flow rate control valve (solenoid valve) (13) is provided with the spring (60) for biasing the spool (51) of the same flow rate control valve towards its high speed position, an electromagnetic coil (solenoid) (57) for moving the spool (51) towards its low speed position against the biasing force of the spring (60), and the control apparatus (15) for supplying a large current to the same solenoid (57) upon low speed driving and a small current thereto upon high speed driving, as described above. It is to be noted that the condition where a car speed is zero and yet an engine rotational speed is equal to or higher than 2000 rpm cannot be present normally. Therefore, if such condition continues for 5–10 seconds or more, then it is judged that any fault (such as, for example, a fault in a car speed pulse system or a fault in a flow rate control valve system) has arisen, and the relay (90) is turned ON to interrupt current feed to the flow rate control valve (13) (the electromagnetic coil (57)). Accordingly, upon high speed driving, manipulation of a steering wheel becomes heavy (having a failsafe function), and so the system is safe.

In addition, the power steering system according to the present invention can achieve the following effect, owing to the fact that the aforementioned flow rate control valve (13) is provided with the plunger (52), the spring (60) for biasing the plunger (52) towards its high speed position, the electromagnetic coil (57) for moving the plunger (52) towards its low speed position against the biasing force of the spring (60), the spool (51) loosely fitted around the plunger (52), the fixedly fastening member (54) for fixedly fastening the same spool (51) to the plunger (52) and the sleeve (50) disposed slidably and liquid-tightly around the spool (51), as described above. It is to be noted that a finishing precision of the order of microns is required between the sleeve (50) and the spool (51). On the other hand, the plunger (52) is assembled in the casing (20) by the intermediary of a number of parts on the side of the electromagnetic valve (57) of the flow rate control valve (13). Therefore, it is, in practice, nearly impossible to align the axis of the plunger (52) with the axis of the side of the spool (51) within the above-mentioned range of precision. However, according to the present invention, the spool (51) is loosely fitted around the plunger (52) with a little gap clearance retained therebetween, so that a misalignment caused by the above-mentioned assembly on the side of the plunger (52) can be absorbed by this gap clearance and is not transmitted to the spool (51), and therefore, the sleeve (50) and the spool (51) can be maintained in the above-mentioned finishing condition. Therefore, there is an effect that the operation of the flow rate control valve (13) having the electromagnetic coil (57 and the plunger (52) can be smoothened. It is to be noted that if the plunger (52) to be press-inserted into the member (53) made of magnetic material is made of non-magnetic material, then even if foreign matters such as iron powder or the like should exist in the working oil, these foreign matters would not be adsorbed by the oil path within the plunger (52), and in this respect also, the operation of the flow rate control valve can be smoothened.

In the power steering system according to the present invention, since the outer diameters (See ($D_1$) and ($D_2$) in FIG. 21) of the sleeve (50) of the above-mentioned flow rate control valve (13) are successively reduced along the direction of assembly into the valve housing (20) and the annular grooves for the O-rings (62) are provided on the outer peripheral surface of the sleeve (50) as described above, when the sleeve (50) is assembled into the valve housing (20), biting of the O-rings which is caused by the O-rings (62) being forced out of the annular grooves can be prevented, and the oil-tightness between the valve housing (20) and the sleeve (50) can be improved. In addition, since the sleeve (50) is formed in the above-described manner, there is an effect that when the sleeve (50) is inserted jointly with the O-rings (62) into the sleeve fitting bore of the valve housing (20), a frictional resistance can be reduced, and so, the sleeve (50) can be easily assembled into the sleeve fitting bore of the valve housing (20).

Furthermore, the power steering system according to the present invention has an effect that the construction of the oil paths can be made compact, owing to the facts that the pressure control valve (12) includes the sleeve (40) and the spool (41), that on the outer peripheral surface of the same sleeve (40) are provided the notch (40b) and port (40b') communicating with the most upstream side of the oil path extending from the above-mentioned high pressure oil path to the above-described reaction piston, the notch (40d) and orifice (d) communicating with one (7e) of the above-described parallel oil paths, the notch (40e) and port (40e') communicating with the side of the aforementioned reaction piston, and the connecting notch (40c) and ports (40c') and (40c''), and that on the outer peripheral surface of the above-mentioned spool (41) are provided the mutually independent annular paths (41a) and (41b) which are formed with the aid of the inner peripheral surface of the above-mentioned sleeve (40) so that the orifice (b) and port (40e') may be communicated with the annular path (41b), the port (40c') may be communicated with the annular path (41a), the port (40c'') may be communicated with the annular path (41b) and the port (40b') may be communicated with or blocked from the annular path (41a) according to movement of the spool (41), as described above.

In addition, the power steering system according to the present invention has the following effects and advantages, owing to the fact that a plurality of reaction pistons (5) are disposed around the input shaft (21) radially at an equal interval along a circumferential direction as will be apparent from FIGS. 3, 33 and 34. More particularly, if the reaction pistons (5) are not provided around the torsion bar (22) connecting the input shaft (21) with the cylinder block (23), a neutral holding force is not present, and if it is tried to increase the reaction to hands upon running, then a steering force under a stopped condition becomes large. However, as described previously, if a plurality of reaction pistons (5) are disposed around the input shaft (21) and an oil pressure controlled depending upon a car speed signal is led to the chambers (6) behind the respective reaction pistons (5), then it is possible to make a steering force under a stopped condition small, to increase a neutral holding force and a steering reaction force during running and to thereby improve the feeling of steering. However, in the prior art (See FIG. 32), a plurality of reaction pistons (a) are disposed so as to pinch the both wing portions of an input shaft (6) from their opposite sides. Whereas, according to the present invention (See FIGS. 3, 33 and 34), a plurality of reaction pistons (5) are disposed around the input shaft (21) radially and at an equal interval along the circumferential direction. Therefore, between the respective arrangements of the reaction pistons there exists the following difference in effects and advantages. At first, explaining about the reaction effect, a torsion torque T' in the prior art arrangement shown in FIG. 32 is represented by the following equation:

$$T' = \frac{nFR}{2} \quad \text{(a number of reaction pistons: } n,$$

$$\text{a number of effective pistons: } \frac{n}{2}\text{)}$$

On the other hand, the torsion torque T in the reaction piston arrangement according to the present invention shown in FIG. 33 is represented by the following equation:

$T = n \cdot p \cdot r$ (a number of reaction pistons: $n$, a number of effective pistons: $n$)

$$p = \frac{F}{\sin \theta} \quad r = R \cos \theta \text{ hence } T = \frac{nFR}{\tan \theta}.$$

Accordingly, the reaction effects are compared by the following equation:

$$\frac{T}{T'} = \frac{2}{\tan \theta}$$

In other words, even if the numbers of reaction pistons are the same in the respective reaction piston arrangement, T>T' can be realized by selecting the angle $\theta$ to be small. The examples of the ratio of the torsion torques are enumerated as follows:

| | |
|---|---|
| $\theta = 30°$ | $T/T' = 3.46$ |
| $\theta = 45°$ | $T/T' = 2.0$ |
| $\theta = 60°$ | $T/T' = 1.15$ |
| $\theta = 75°$ | $T/T' = 0.54$ |

Figure 42:
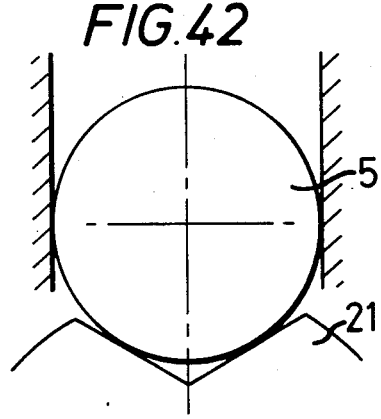
Figure 43:
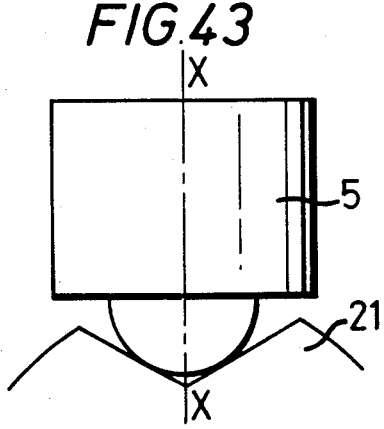
Figure 44:
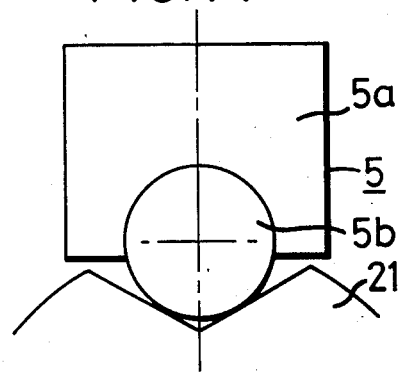

Now, description will be made on the point that the torsion torque T can be arbitrarily set according to the present invention. In the case where the input shaft (21) has been twisted by an angle $\phi$ with respect to the cylinder block (23) (See FIG. 36), assuming that the cross-section edges of the grooves in the input shaft (21) are linear, the groove UVW moves to the position U'V'W' and the contact point between the reaction piston (5) and the groove UVW moves from the position A to the position A'. In other words, the reaction piston (5) retires by a distance $\delta$ and the contact point on the groove moves from A to A'. Accordingly, the torsion torque T produced by the reaction piston (5) can be arbitrarily set by varying the angle $\theta$ of the groove so that the contact point between the reaction piston (5) and the groove may come within the range of A—A" in FIG. 36, assuming that A" represents a point on line UV which fulfils the relation of $\overline{A''V} = \overline{A'V'}$. It is to be noted that FIG. 35 shows a neutral condition of the reaction piston (5). In addition, FIG. 37 shows another preferred embodiment of the groove, in which the tip end of the reaction piston (5) is made to butt against the central bottom portion of the groove, and FIG. 38 shows still another preferred embodiment of the groove in which the tip end of the reaction piston (5) is made to butt against the both side portions of the groove. FIGS. 39, 40 and 41 show the characteristics of the reaction pistons (5) illustrated in FIGS. 35 and 36, in FIG. 37 and in FIG. 38, respectively. FIG. 42 illustrates another preferred embodiment in which the reaction piston (5) is formed in a spherical shape, FIG. 43 illustrates still another preferred embodiment in which the cross-section edges of the groove is made linear and on the other hand the reaction piston (5) is modified into a body of revolution about an X—X axis so that the characteristic of the torsion torque T can be arbitrarily set, and FIG. 44 illustrates yet another preferred embodiment in which the reaction piston (5) is formed of a reaction piston main body (5a) and a spherical body (5b) (modified into a separated type).

FIG. 45 shows another preferred embodiment of the pressure control valve (12) section designed with the following object. In the above-described power steering system illustrated in FIGS. 1 through 25, the pressure of the working oil supplied from the oil pump (1) is controlled by the pressure control valve (12) and the flow rate control valve (solenoid valve) (13), and the working oil is returned through the first orifice (d) and the return oil path (41d) to the reservoir tank (4). In such a power steering system, since the first orifice (d) is formed as a fixed orifice having a constant extent of opening, a difference occurs in the oil flow through the port sections of the pressure control valve (12) between the time of steering under a high speed (20 km/h or higher) running condition when the valve is used under a low pressure (20 kg/cm² or lower) and the time of steering under a low speed (lower than 20 km/h) running or stopped condition when the valve is used under a high pressure (30–70 kg/cm²), and while an abnormal sound (a sound of a flow occurring due to a jet flow of the oil) is not generated at the time of steering under a high speed running condition when the pressure of the oil supplied from the oil pump to the pressure control valve (12) section is lower than 20 kg/cm², at the time of steering under a low speed running or stopped condition, since the valve is used at a high pressure of 30 kg/cm² or higher of the oil supplied from the pump to the pressure control valve (12) section, under the condition just before the working oil is cut off in the pressure control valve section the oil takes a jet flow condition in the pressure control valve (12), and so an abnormal sound of a flow is generated.

This modified embodiment aims at reducing this type of sound of a flow, and it is characterized in that as shown in FIG. 45 within the pressure control valve (12) is slidably provided a first plunger (41') having a plurality of distributed orifices ($f_1$), ($f_2$) and ($f_3$), in addition there is provided a second plunger (41") having a path (g) as opposed to the distributed orifice ($f_1$)-($f_3$) of the first plunger (41'), and a compression spring (100) is interposed between the first and second plungers (41') and (41"). It is to be noted that the number of the distributed orifices ($f_1$)-($f_3$) is not limited to that in the illustrated example. In addition, reference numeral (101) in FIG. 45 designates a gear box and numeral (102) designates a wire ring.

Now description will be made on the operation of the above-described modified embodiment of the pressure control valve (12). Upon steering under a high speed (20 km/h or higher) running condition, since the pressure of the oil supplied from the oil pump (1) to the pressure control valve (12) section is as low as 20 kg/cm$^2$ or less, the condition where the plunger (41') is apart from the plunger (41") as illustrated in FIG. 45 appears, and the pressure control valve (12) operates to slide within the housing (20) so as to open and close the port (41a) while the working oil is flowing from the distributed orifice ($f_1$), ($f_2$) and ($f_3$) into the return oil path (41d). As described above, upon steering under a high speed running condition, as the pressure of the oil supplied from the oil pump (1) is low, the working oil would not take a jet flow condition at the port (41a) section, and so an abnormal sound would not be generated.

However, upon steering under a low speed (lower than 20 km/h) running or stopped condition, since the pressure of the oil supplied from the oil pump (1) to the pressure control valve section (12) is as high as 30 kg/cm$^2$ or more, the plunger (41') is brought into tight contact with the plunger (41") due to the oil pressure acting upon a step portion (41f) through a pilot pressure path (7c$_1$) to make only the distributed orifice (f$_1$) effective, hence a pressure difference is produced at that portion, and the pressure control valve (12) operates so as to easily close the port (41a). Consequently, the flow rate of the oil flowing through the port (41a) is reduced. In this way, upon steering under a low speed running or stopped condition, since it is possible to increase the force urging the spool (41) to the leftward direction as viewed in FIG. 45 by producing a pressure difference at the distributed orifice section, the cut-off of the port (41a) in the pressure control valve (12) section can be achieved easily, and consequently the flow rate would be reduced, so that the working oil tending to take a jet flow condition at the port (41a) section can be cut off at an early time and thus generation of a sound of a flow can be prevented. Moreover, in the modified embodiment, since the plungers (41') and (41") are disposed within the pressure control valve and they are adapted to be integrated by connecting the variable orifice to the return oil path, there are advantages that the apparatus can be assembled in a compact form, there is no need to provide pipings separately and the apparatus can be manufactured at a low cost.

What is claimed is:

1. A power steering system comprising: an input shaft coupled to a steering wheel; a torsion bar for transmitting rotation of said input shaft to an output shaft; an oil path switching valve engaged with said output shaft so as to rotate integrally with said output shaft and in which oil paths are switched according to a rotational angle difference between said input shaft and said output shaft; a power cylinder coupled to said output shaft; a high pressure oil path for supplying working oil delivered from an oil pump to said power cylinder via said oil path switching valve; a low pressure oil path for returning the working oil from said power cylinder to an oil tank via said oil path switching valve; a reaction piston means operatively engaged with said input shaft for applying a restraint force which restrains the rotational angle difference between the input shaft and the output shaft; a control oil path branched from said high pressure oil path and communicating with said reaction piston means; a pressure control valve means interposed in said control oil path for controlling the oil pressure to be equal to or lower than a predetermined highest pressure; a flow rate control valve connected on the downstream side of said pressure control valve for controlling a flow rate from said pressure control valve in response to a car speed, a first orifice communicating the downstream side of said flow rate control valve with said low pressure oil path, and a pilot oil pressure path connected between the upstream side of said first orifice and said pressure control valve for transmitting a pilot pressure generated upstream of said first orifice to said pressure control valve for controlling the delivery pressure from the oil pump to said power cylinder so that the steering torque is linearly proportional to the oil pump delivery pressure and for controlling the oil pressure to said reaction piston for causing the reaction force of said reaction piston means to be in proportion to the speed of the car.

2. A power steering system as claimed in claim 1, in which there is a pair of parallel oil paths provided on the downstream side of said pressure control valve, one of them having a second orifice therein, and said flow rate control valve comprises means for selecting at least one of said pair of parallel oil paths for controlling the flow rate.

3. A power steering system as claimed in claim 2, in which said flow rate conrol valve comprises a biasing spring means for moving said flow rate control valve to select said one parallel oil path, and solenoid means through which current proportional to the car speed is padded for moving said flow rate control valve to select the other parallel oil path.

4. A power steering system as claimed in claim 1, in which said output shaft has a pinion thereon, and said power cylinder has a rack connected thereto with which said pinion is engaged.

5. A power steering system as claimed in claim 4, in which said flow rate control valve comprises a sleeve having a pair of oil paths communicating with the respective ones of the pair of parallel oil paths, and a spool slidably fitted in said sleeve, said spool having an oil path therewithin and a further oil path for communicating said oil path therewithin with at least one of the pair of oil paths provided in said sleeve.

6. A power steering system as claimed in claim 4, further comprising a car speed sensor for generating an electric signal that is proportional to a car speed, and a control apparatus responsive to the signal generated by said car speed sensor for supplying a minimum current to said solenoid of said flow rate control valve when the car speed is high and supplying a maximum current when the car speed is zero.

7. A power steering system as claimed in claim 1, in which said input shaft is a hollow cylindrical shaft, a torsion bar extending through the interior of said input shaft and having its one end fixedly secured to one end portion of said input shaft and the other end projected from a free end portion of the input shaft, a pinion and a cylindrical portion surrounding the free end portion of said input shaft which are both formed in said output shaft, and said reaction piston means includes a plurality of reaction pistons positioned in a plane perpendicular to the axis of said input shaft and which have their axes disposed radially and at equal intervals in the circumferential direction and which are disposed within said cylindrical portion, and a plurality of longitudinal grooves formed on an outer peripheral surface of the free end portion of said input shaft and the reaction pistons having projections engaged with said grooves.

8. A power steering system as claimed in claim 7, in which said control apparatus includes an engine rotational speed sensor for generating an electric signal that is proportional to an engine rotational speed, a timer circuit that is set by the signal generated by the engine rotational speed sensor when the rotational speed is equal to or higher than a predetermined rotational speed and is reset by a signal other than a zero car speed signal, and a wire cut-off detector circuit for detecting a wire cut-off condition after lapse of a predetermined time by means of said timer circuit and interrupting supply of a current to the solenoid.

9. A power steering system as claimed in claim 1, in which said flow rate control valve includes a plunger adapted to be driven by a solenoid, a spool loosely fitted around the proximity of a free end of said plunger, restraint means for axially restraining said spool in a fastened condition, and a sleeve in which said spool is fitted in an oil-tight manner and which is fixed within a valve housing, a plurality of oil paths formed in said sleeve being controllably opened and closed by said sleeve.

10. A power steering system as claimed in claim 1, in which said flow rate control valve includes a sleeve inserted and held within a valve housing and provided with an outer peripheral surface having its diameter successively reduced in a stepped manner along the direction of insertion and O-rings respectively disposed in annular grooves formed in the respective steps of said outer peripheral surface.

11. A power steering system as claimed in claim 1, in which said pressure control valve includes a valve housing having a plurality of oil paths drilled therein, a sleeve inserted and held within said valve housing and having a plurality of notch-shaped oil paths formed at such positions that the oil paths do not overlap with each other in the axial or circumferential direction, and a spool slidably disposed within said sleeve and having a plurality of annular passageways therein, whereby the oil paths in the valve housing may be appropriately communicated via the notch-shaped oil paths.

12. A power steering system as claimed in claim 11, further comprising an oil filter provided in the notch-shaped oil path at the most upstream position of the control oil path in the sleeve forming the pressure control valve.

13. A power steering system as claimed in claim 12, in which said oil filter is made of a frame body and a wire netting 14.

14. A power steering system as claimed in claim 1, in which said pressure control valve includes a sleeve (40) fixedly held within a valve housing and having an oil path (40b′) which communicates with a control oil path (7c) drilled in said valve housing, a spool (41) disposed slidably within said sleeve (40) and having a larger diameter portion and a smaller diameter portion within which an oil path (41a) communicated with a low pressure oil path (8b) is formed, an annular oil path (41a) formed in the larger diameter portion of said spool (41) for controllably opening and closing an oil path (40b), an annular oil path (41b) formed between the larger diameter portion and the smaller diameter portion and communicated with said oil path (41a), a spring (44) disposed on an end surface of said spool (41) in a compressed condition for biasing the spool (41) in the direction of opening the oil path (40b), and a member (45) having a first orifice (d) which is fixedly secured to an upstream end of an oil path (41d) of said spool (41) for actuating the spool (41) in the direction of opening the oil path by a pressure difference depending flow rate.

15. A power steering system as claimed in claim 20, said pressure control valve comprising a sleeve (40) fixedly held within a valve housing and having an oil path (40b) which communicates with a control oil path (7c) drilled in said valve housing, a cylindrical spool (41) disposed slidably within said sleeve (40) and having a larger diameter portion and a smaller diameter portion, an annular oil path (41a) formed in the larger diameter portion of said spool (41) for controllably opening and closing the oil path (40b), an annular oil path (41b) formed between the larger diameter portion and the smaller diameter portion and communicated with said oil path (41a), a spring (44) disposed on an end surface of said spool (41) in a compressed condition for biasing the spool (41) in the direction of opening the oil path (40b), plungers (41′) and (41″) serially disposed within said spool (41), a spring (100) disposed between the plungers (41′) and (41″) in a compressed condition, an oil path (41f) formed in the plunger (41′) so as to communicate with the oil path (40b) and having a different oil pressure acting area, a plurality of distributed orifices formed in the plunger (41′) on the side of the plunger (41″), and an orifice structure having a first orifice (d) formed in the plunger (41″) in which if an oil pressure in a high pressure oil path acting upon an oil path (41f) is increased, the plunger (41′) is moved towards the plunger (41″) against the biasing force of the spring (100) to communicate only a part of the distributed orifices in the plunger (41′) with the first orifice (d) in the plunger (41″) and thereby a flow rate through the first orifice (d) is controlled to be reduced.

16. A power steering system as claimed in claim 1 further comprising an auxiliary pilot oil pressure path connected from the output side of said pressure control valve means to said pressure control valve means for applying an auxiliary pilot oil pressure from the downstream side of said pressure control valve means for limiting the oil pressure in said high pressure oil path in response to said auxiliary pilot oil pressure so as to be equal to or lower than a predetermined highest pressure.

17. A power steering system comprising an input shaft coupled to a steering wheel, a torsion bar for transmitting rotation of said input shaft to an output shaft, an oil path switching valve in which oil paths are switched according to a rotational angle difference between said input shaft and said output shaft, a power cylinder coupled to said output shaft, a high pressure oil path for supplying working oil delivered from an oil pump to the power cylinder via said oil path switching valve, a low pressure oil path for returning the working oil from said power cylinder to an oil tank via the oil path switching valve, a reaction piston interposed between said input shaft and said output shaft for restraining the rotational angle difference therebetween by a restraint force, a main orifice disposed in said high pressure oil path, a control oil path branched from an upstream side of the main orifice in said high pressure oil path and communicating with said reaction piston, a pressure control valve interposed in said control oil path for controlling an oil pressure to be equal to or lower than a predetermined highest pressure, a flow rate control valve disposed on the downstream side of said pressure control valve for controlling a flow rate depending upon a car speed, a first orifice provided on the downstream side of said flow rate control valve for generating a pilot pressure corresponding to the flow rate, a pilot oil path for supplying said pilot pressure to said pressure control valve, a bypass for bypassing the upstream and downstream sides of said main orifice, and oil pressure increase means provided in said bypass for closing said bypass to increase the oil pressure in the overall control oil path only when the oil pressure on the downstream side of the pressure control valve is equal to or lower than a predetermined lowest value.

18. A power steering system comprising an input shaft coupled to a steering wheel, a torsion bar for transmitting rotation of said input shaft to an output shaft, an oil path switching valve in which oil paths are switched according to a rotational angle difference between said input shaft and said output shaft, a power cylinder coupled to said output shaft, a high pressure oil path for supplying working oil delivered from an oil pump to the power cylinder via said oil path switching valve, a low pressure oil path for returning the working oil from said power cylinder to an oil tank via the oil path switching valve, a reaction piston interposed between said input shaft and said output shaft for restraining the rotational angle difference therebetween by a restraint force, a main orifice disposed in said high pressure oil path, a control oil path branched from an upstream side of the main orifice in said high pressure oil path and communicating with said reaction piston, a pressure control valve interposed in said control oil path for controlling an oil pressure to be equal to or lower than a predetermined highest pressure, a flow rate control valve disposed on the downstream side of said pressure control valve for controlling a flow rate depending upon a car speed, a first orifice provided on the downstream side of said flow rate control valve for generating a pilot pressure corresponding to the flow rate, a pilot oil path for supplying said pilot pressure to said pressure control valve, a bypass for bypassing the upstream and downstream sides of said main orifice, and oil pressure increase means provided in said bypass for closing said bypass to increase the oil pressure in the overall control oil path only when the oil pressure on the downstream side of the pressure control valve is equal to or lower than a predetermined lowest value; and having a valve assembly structure; in which first, second and third cylinders having respective center axes aligned in parallel to each other are formed within a valve housing, in which a cylindrical input shaft, a torsion bar disposed within said input shaft and having one end fixedly secured to one end of the input shaft and the other end projected and extended from the other end of the input shaft, a pinion coupled to the other end of said torsion bar and forming the output shaft, an oil path switching valve disposed so as to surround the input shaft, and a plurality of reaction pistons disposed radially on the side of the pinion in the circumference of the lower end portion of the input shaft and having projections engaged with grooves formed in the axial direction on the input shaft, are disposed within the first cylinder, in which a pressure control valve for supplying a control oil pressure to be fed to said reaction piston as branched from the high pressure oil path, and a flow rate control valve provided on the downstream side of said pressure control valve, are disposed in series within the second cylinder, and in which a change-over valve forming the oil pressure increase means which opens and closes the bypass depending upon the oil pressure on the downstream side of said pressure control valve is disposed within the third cylinder.

19. A power steering system comprising an input shaft coupled to a steering wheel, a torsion bar for transmitting rotation of said input shaft to an output shaft, an oil path switching valve in which oil paths are switched according to a rotational angle difference between said input shaft and said output shaft, a power cylinder coupled to said output shaft, a high pressure oil path for supplying working oil delivered from an oil pump to the power cylinder via said oil path switching valve, a low pressure oil path for returning the working oil from said power cylinder to an oil tank via the oil path switching valve, a reaction piston interposed between said input shaft and said output shaft for restraining the rotational angle difference therebetween by a restraint force, a control oil path branched from said high pressure oil path and communicated with said reaction piston, a pressure control valve interposed in said control oil path for controlling an oil pressure to be equal to or lower than a predetermined highest pressure, a flow rate control valve disposed on the downstream side of said pressure control valve for controlling a flow rate by selecting at least one of a pair of parallel oil paths in one of which a second orifice is provided, depending upon a car speed, a first orifice for communicating the downstream side of said flow rate control valve with said low pressure oil path, a pilot oil path for transmitting a pilot pressure generated on the upstream side of said first orifice to said pressure control valve, and a third orifice provided in an oil path for communicating the other of said pair of parallel oil paths to said low pressure oil path.

* * * * *